US009028592B2

(12) United States Patent
Eisenberger

(10) Patent No.: US 9,028,592 B2
(45) Date of Patent: May 12, 2015

(54) SYSTEM AND METHOD FOR CARBON DIOXIDE CAPTURE AND SEQUESTRATION FROM RELATIVELY HIGH CONCENTRATION $CO_2$ MIXTURES

(71) Applicant: Peter Eisenberger, New York, NY (US)

(72) Inventor: Peter Eisenberger, New York, NY (US)

(*) Notice: Subject to any disclaimer, the term of this patent is extended or adjusted under 35 U.S.C. 154(b) by 70 days.

(21) Appl. No.: 13/886,207

(22) Filed: May 2, 2013

(65) Prior Publication Data

US 2013/0312606 A1 Nov. 28, 2013

Related U.S. Application Data

(63) Continuation-in-part of application No. 13/098,370, filed on Apr. 29, 2011, now Pat. No. 8,500,855.

(60) Provisional application No. 61/330,108, filed on Apr. 30, 2010, provisional application No. 61/351,216, filed on Jun. 3, 2010, provisional application No. 61/443,061, filed on Feb. 15, 2011, provisional application No. 61/643,103, filed on May 4, 2012.

(51) Int. Cl.
*B01D 53/02* (2006.01)
*B01D 53/04* (2006.01)
*B01D 53/047* (2006.01)

(52) U.S. Cl.
CPC .......... *B01D 53/0407* (2013.01); *B01D 53/047* (2013.01); *B01D 2252/204* (2013.01);
(Continued)

(58) Field of Classification Search
CPC ................... B01D 2252/204; B01D 2253/106; B01D 2253/108; B01D 2257/504; B01D 2258/06; B01D 2259/4005; B01D 53/0407; B01D 53/047; Y02C 10/04; Y02C 10/08
USPC ................................ 95/107, 139; 96/128, 146
See application file for complete search history.

(56) References Cited

U.S. PATENT DOCUMENTS 3,466,138 A 9/1969 Spiegler et al.
3,491,031 A 1/1970 Stoneburner
(Continued)

FOREIGN PATENT DOCUMENTS

DE 200 01 385 U1 9/2000
EP 20021180511 A2 2/2002
(Continued)

OTHER PUBLICATIONS

Stolaroff, Joshuah et al. "A Pilot-scale prototype contractor for CO2 capture from ambient air; cost and energy requirements." (2006) www.ucalgary.ca/~keith/papers/84.Stolaroff.Air . . . .
(Continued)

*Primary Examiner* — Christopher P Jones
(74) *Attorney, Agent, or Firm* — Paul J. Sutton; Barry G. Magidoff

(57) ABSTRACT

A system and method of reducing the net carbon dioxide footprint of an industrial process that generates power from the combustion of hydrocarbon fuels in which ambient air is admixed with up to 50% by volume of an effluent gas from the power generator of the industrial process, in order to substantially increase the $CO_2$ concentration in the air prior to treatment. The treatment comprises adsorbing $CO_2$ from the admixed ambient air utilizing a cooled, porous substrate-supported amine adsorbent, wherein the porous substrate initially contacts the mixed ambient air containing condensed water in its pores, which act as an intrinsic coolant with respect to the exothermic heat generated by the adsorption process. In addition, prior to regenerating the supported adsorbent, air pressure is substantially reduced in the sealed regeneration chamber and the low pressure chamber is placed in fluid connection with a higher pressure regeneration chamber containing steam and carbon dioxide, to preheat the sorbent to be regenerated and to quickly cool the regenerated sorbent prior to use for further $CO_2$ adsorption.

13 Claims, 8 Drawing Sheets

(52) U.S. Cl.
CPC ..... *B01D2253/106* (2013.01); *B01D 2253/108* (2013.01); *B01D 2257/504* (2013.01); *B01D 2258/06* (2013.01); *B01D 2259/4005* (2013.01); *Y02C 10/08* (2013.01); *Y02C 10/04* (2013.01)

(56) References Cited

U.S. PATENT DOCUMENTS

| | | |
|---|---|---|
| 3,865,924 A | 2/1975 | Gidaspow et al. |
| 3,880,981 A | 4/1975 | Garingarao |
| 3,948,627 A | 4/1976 | Schwarz et al. |
| 4,047,894 A | 9/1977 | Kuhl et al. |
| 4,152,217 A | 5/1979 | Eisenberger et al. |
| 4,197,421 A | 4/1980 | Steinberg |
| 4,239,515 A | 12/1980 | Yanagioka et al. |
| 4,243,613 A | 1/1981 | Brockhaus et al. |
| 4,285,918 A | 8/1981 | Gustafson |
| 4,455,153 A | 6/1984 | Jakahi |
| 4,472,178 A | 9/1984 | Kumar |
| 4,497,641 A | 2/1985 | Brown et al. |
| 4,528,248 A | 7/1985 | Galbraith et al. |
| 4,579,723 A | 4/1986 | Weltmer et al. |
| 4,711,645 A | 12/1987 | Kumar |
| 4,762,528 A | 8/1988 | Reichl |
| 4,810,266 A | 3/1989 | Zinnen et al. |
| 4,822,383 A | 4/1989 | Brose et al. |
| 5,061,455 A | 10/1991 | Brose et al. |
| 5,087,597 A | 2/1992 | Leal et al. |
| 5,364,887 A | 11/1994 | Konig et al. |
| 5,376,614 A | 12/1994 | Birbara et al. |
| 5,424,051 A | 6/1995 | Nagji et al. |
| 5,443,804 A | 8/1995 | Parker et al. |
| 5,492,683 A | 2/1996 | Birbara et al. |
| 5,520,894 A | 5/1996 | Heesink et al. |
| 5,593,475 A | 1/1997 | Minh |
| 5,635,142 A | 6/1997 | Ichiki et al. |
| 5,642,630 A | 7/1997 | Abdelmalek et al. |
| 5,653,785 A | 8/1997 | Horio et al. |
| 5,876,488 A | 3/1999 | Birbara et al. |
| 5,879,432 A | 3/1999 | Morlec et al. |
| 5,906,806 A | 5/1999 | Clark |
| 5,928,806 A | 7/1999 | Olah et al. |
| 5,958,353 A | 9/1999 | Eyal |
| 6,004,381 A | 12/1999 | Rohrbach et al. |
| 6,048,509 A | 4/2000 | Kawai et al. |
| 6,090,186 A | 7/2000 | Spencer |
| 6,106,595 A | 8/2000 | Spencer |
| 6,117,404 A | 9/2000 | Mimura et al. |
| 6,174,506 B1 | 1/2001 | Chakravarti et al. |
| 6,364,938 B1 | 4/2002 | Birbara et al. |
| 6,387,337 B1 | 5/2002 | Pennline et al. |
| 6,540,936 B1 | 4/2003 | Takagi et al. |
| 6,547,854 B1 | 4/2003 | Gray et al. |
| 6,612,485 B2 | 9/2003 | Lackner et al. |
| 6,790,430 B1 | 9/2004 | Lackner et al. |
| 6,797,039 B2 | 9/2004 | Spencer |
| 6,890,497 B2 | 5/2005 | Rau et al. |
| 6,908,497 B1 | 6/2005 | Sirwardane |
| 6,929,680 B2 | 8/2005 | Krushnevych et al. |
| 7,128,777 B2 | 10/2006 | Spencer |
| 7,132,090 B2 | 11/2006 | Dziedzic et al. |
| 7,141,859 B2 | 11/2006 | DeBoer et al. |
| 7,288,136 B1 | 10/2007 | Gray et al. |
| 7,452,406 B2 | 11/2008 | Little et al. |
| 7,655,069 B2 | 2/2010 | Wright et al. |
| 7,666,250 B1 | 2/2010 | Blenco et al. |
| 7,699,909 B2 | 4/2010 | Lackner et al. |
| 7,708,806 B2 | 5/2010 | Wright et al. |
| 7,795,175 B2 | 9/2010 | Olah et al. |
| 7,799,310 B2 | 9/2010 | Lackner et al. |
| 7,833,328 B2 | 11/2010 | Lackner et al. |
| 7,909,911 B2 | 3/2011 | Lackner et al. |
| 7,947,239 B2 | 5/2011 | Lackner et al. |
| 7,988,766 B2 | 8/2011 | White et al. |
| 7,993,432 B2 | 8/2011 | Wright et al. |
| 8,043,594 B2 | 10/2011 | Lackner et al. |
| 8,083,836 B2 | 12/2011 | Wright et al. |
| 8,088,197 B2 | 1/2012 | Wright et al. |
| 8,118,914 B2 | 2/2012 | Liu et al. |
| 8,123,842 B2 | 2/2012 | Pan et al. |
| 8,133,305 B2 | 3/2012 | Lackner et al. |
| 8,163,066 B2 | 4/2012 | Eisenberger |
| 8,491,705 B2 | 7/2013 | Choi et al. |
| 2001/0004895 A1 | 6/2001 | Preiss |
| 2001/0047995 A1 | 12/2001 | Pozgainer et al. |
| 2002/0000260 A1 | 1/2002 | Palvoelgyi et al. |
| 2002/0083833 A1 | 7/2002 | Nalette et al. |
| 2002/0187372 A1 | 12/2002 | Hall et al. |
| 2003/0061906 A1 | 4/2003 | Knunz et al. |
| 2003/0075012 A1 | 4/2003 | Knunz et al. |
| 2004/0142888 A1 | 7/2004 | Manne et al. |
| 2004/0213705 A1 | 10/2004 | Blencoe |
| 2004/0253159 A1 | 12/2004 | Hakka et al. |
| 2005/0180910 A1 | 8/2005 | Park et al. |
| 2006/0051274 A1 | 3/2006 | Wright et al. |
| 2006/0084063 A1 | 4/2006 | Costa et al. |
| 2006/0101945 A1 | 5/2006 | Lackner et al. |
| 2006/0105419 A1 | 5/2006 | Blankenberg et al. |
| 2006/0165574 A1 | 7/2006 | Sayari |
| 2006/0168940 A1 | 8/2006 | Offenhuber et al. |
| 2006/0178989 A1 | 8/2006 | Lackner et al. |
| 2006/0186562 A1 | 8/2006 | Wright et al. |
| 2006/0188423 A1 | 8/2006 | Cadours et al. |
| 2006/0289003 A1 | 12/2006 | Lackner et al. |
| 2007/0004023 A1 | 1/2007 | Trachtenberg |
| 2007/0033767 A1 | 2/2007 | Dodson et al. |
| 2007/0068525 A1 | 3/2007 | Offenhuber et al. |
| 2007/0086909 A1 | 4/2007 | Abenthung et al. |
| 2007/0187247 A1 | 8/2007 | Lackner et al. |
| 2007/0209349 A1 | 9/2007 | Ripper et al. |
| 2008/0031801 A1 | 2/2008 | Lackner et al. |
| 2008/0064184 A1 | 3/2008 | Lackner et al. |
| 2008/0087165 A1 | 4/2008 | Wright et al. |
| 2008/0112868 A1 | 5/2008 | Blencoe |
| 2008/0124666 A1 | 5/2008 | Stocker et al. |
| 2008/0138265 A1 | 6/2008 | Lackner et al. |
| 2008/0190567 A1 | 8/2008 | Winsness et al. |
| 2008/0250715 A1 | 10/2008 | Cooper et al. |
| 2008/0289319 A1 | 11/2008 | Eisenberger et al. |
| 2008/0289495 A1 | 11/2008 | Eisenberger et al. |
| 2008/0289499 A1 | 11/2008 | Eisenberger et al. |
| 2008/0289500 A1 | 11/2008 | Eisenberger et al. |
| 2009/0101050 A1 | 4/2009 | Lackner et al. |
| 2009/0232861 A1 | 9/2009 | Wright et al. |
| 2009/0320368 A1 | 12/2009 | Castaldi et al. |
| 2010/0095842 A1 | 4/2010 | Lackner et al. |
| 2010/0105126 A1 | 4/2010 | Wright et al. |
| 2010/0116137 A1 | 5/2010 | Wright et al. |
| 2010/0202937 A1 | 8/2010 | Lackner et al. |
| 2010/0263534 A1 | 10/2010 | Chuang |
| 2011/0027143 A1 | 2/2011 | Wright et al. |
| 2011/0027157 A1 | 2/2011 | Wright et al. |
| 2011/0033357 A1 | 2/2011 | Wright et al. |
| 2011/0033358 A1 | 2/2011 | Wright et al. |
| 2011/0056382 A1 | 3/2011 | Lackner et al. |
| 2011/0079144 A1 | 4/2011 | Wright et al. |
| 2011/0079146 A1 | 4/2011 | Wright et al. |
| 2011/0079147 A1 | 4/2011 | Wright et al. |
| 2011/0079149 A1 | 4/2011 | Wright et al. |
| 2011/0079150 A1 | 4/2011 | Wright et al. |
| 2011/0081709 A1 | 4/2011 | Wright et al. |
| 2011/0081710 A1 | 4/2011 | Wright et al. |
| 2011/0081712 A1 | 4/2011 | Wright et al. |
| 2011/0083554 A1 | 4/2011 | Wright et al. |
| 2011/0088550 A1 | 4/2011 | Tirio |
| 2011/0108421 A1 | 5/2011 | Lackner et al. |
| 2011/0146281 A1 | 6/2011 | Lackner et al. |
| 2011/0185897 A1 | 8/2011 | Wright et al. |
| 2011/0189075 A1 | 8/2011 | Wright et al. |
| 2011/0203174 A1 | 8/2011 | Lackner |
| 2011/0203311 A1 | 8/2011 | Wright et al. |
| 2011/0206588 A1 | 8/2011 | Lackner |
| 2011/0226006 A1 | 9/2011 | Lackner et al. |
| 2011/0268636 A1 | 11/2011 | Lackner et al. |
| 2011/0293503 A1 | 12/2011 | Wright et al. |

(56) References Cited

U.S. PATENT DOCUMENTS

| | | | |
|---|---|---|---|
| 2011/0296872 | A1 | 12/2011 | Eisenberger |
| 2012/0058032 | A1 | 3/2012 | Lackner et al. |
| 2012/0076711 | A1 | 3/2012 | Gebald |

FOREIGN PATENT DOCUMENTS

| | | | |
|---|---|---|---|
| EP | 20021234947 | A2 | 8/2002 |
| FR | 19842543946 | A1 | 10/1984 |
| JP | 58 122022 | A | 7/1983 |
| JP | 198459216839 | | 12/1984 |
| JP | 03-245811 | | 1/1991 |
| JP | 06-062677 | | 3/1994 |
| JP | 07-051537 | | 2/1995 |
| JP | 2001-300250 | | 10/2001 |
| JP | 2003-326155 | | 11/2003 |
| JP | 2006-075717 | | 3/2006 |
| WO | WO98029187 | A1 | 7/1998 |
| WO | WO2005026694 | A2 | 3/2005 |
| WO | WO2005037746 | A1 | 4/2005 |
| WO | WO2005108297 | A2 | 11/2005 |
| WO | WO2006009600 | A2 | 1/2006 |
| WO | WO2006036396 | A2 | 4/2006 |
| WO | WO2008063082 | A2 | 5/2008 |

OTHER PUBLICATIONS

English abstract, CN 1 303 910 A (Jul. 18, 2001).

English abstract, JP 2006-021989 A (Jan. 26, 2006).

Xu et al., "Preparations and characterization of novel $CO_2$ 'molecular basket' absorbents based on polymer-modified mesoporous molecular sieve MCM-41." Microporus and Mesoporus Materials 62: 29-45 (2003).

International Search Report and Written Opinion of the International Search Authority, dated Dec. 18, 2007, from corresponding International application No. PCT/US2007/074615.

Hicks, Jason C. et al.; "Designing Adsorbents for $CO_2$ Capture from Flue GAs-Hyperbranched Aminosilicas Capable of Capturing $CO_2$ Reversibly"; Feb. 2008; J. Amer. Chem. Soc., vol. 130, pp. 2902-2903.

Gold, Blanchard; "Integrated Gasification Combined Cycle IGCC"; www.globalgreenhousewarming.com.

Leal, Orlando; "Reversible adsorption of carbon dioxide on amine surface-bonded silica gel"; 1995; Elsevier Science S.A., Inorganica Chimica Acta 240, pp. 183-189.

Dubey, "Science for sustainability: From capturing carbon dioxide from air to environmental impact of a hydrogen economy," Apr. 2, 2003.

US 9,028,592 B2

SYSTEM AND METHOD FOR CARBON DIOXIDE CAPTURE AND SEQUESTRATION FROM RELATIVELY HIGH CONCENTRATION $CO_2$ MIXTURES

The application claims the benefit or priority pursuant to 35 U.S.C. 119(e) from a U.S. Provisional Patent Application having Application No. 61/643,103 filed Apr. 30, 2010; from a U.S. Provisional Patent Application having Application No. 61/330,108 filed Apr. 30, 2010; from a U.S. Provisional Patent Application having Application No. 61/351,216 filed Jun. 3, 2010 and from a U.S. Provisional Patent Application having Application No. 61/443,061 filed Feb. 15, 2011, and from copending U.S. application Ser. No. 13/098,370, filed on Apr. 29, 2011.

BACKGROUND

The present invention relates to systems and methods for removing greenhouse gases from the atmosphere, and in particular to systems and methods for removing carbon dioxide from a stream of gas, including ambient air.

As a further improvement to the system described in copending U.S. application Ser. No. 13/098,370, filed on Apr. 29, 2011, a suitable system and process is presented that it is now recognized can be utilized for a broader range of use than disclosed in that earlier application, especially when further modified. The disclosure of that copending application is incorporated by reference herein as if repeated in full, as modified by the new disclosure presented herein.

There is much attention currently focused on trying to achieve three somewhat conflicting energy related objectives: 1) provide affordable energy for economic development; 2) achieve energy security; and 3) avoid the destructive climate change caused by global warming. However, there is no feasible way to avoid using fossil fuels during the rest of this century if we are to have the energy needed for economic prosperity and avoid energy shortfalls that could lead to conflict.

It is mostly undisputed by scientists that an increase in the amount of so-called greenhouse gases like carbon dioxide (methane and water vapor are the other major greenhouse gases) will increase the average temperature of the planet.

It is also clear that there is no solution that only reduces the ongoing human contributions to carbon dioxide emissions that can successfully remove the risk of climate change. Removing additional $CO_2$ from the atmosphere is also necessary. With air extraction and the capability to increase or decrease the amount of carbon dioxide in the atmosphere, one can in principle compensate for other greenhouse gases like methane (both naturally occurring and from human activity) that can increase their concentrations and cause climate change.

Until the recent inventions by the present applicant, it was the generally accepted belief among experts in the field that it was not feasible to capture carbon dioxide directly from the atmosphere because of the low concentration of that compound. It was subsequently shown by the copending prior application that it was in fact practical and efficient to carry out such $CO_2$ reductions under specified conditions.

It was shown that under ambient conditions $CO_2$ can be efficiently extracted from the air using a suitable regenerable sorbent system and a low temperature stripping or regeneration process.

SUMMARY OF THE PRESENT INVENTION

The present invention provides further new and useful systems and methods for removing carbon dioxide from a mass of carbon dioxide laden air.

This invention has now been further improved by the discovery that the same low temperature system can also be applied to the capturing of $CO_2$ from a mixture of gases having enhanced carbon dioxide concentration by admixing air with relatively concentrated $CO_2$-containing, flue derived gases diluted with a predominant amount of ambient air; as a further surprise, this further improves efficiency. This can result in a $CO_2$-negative system event for such otherwise "dirty" sources such as power plants, or refineries, or cement manufacturing plants. In such circumstances, it is usually preferable to pre-treat the flue gas to remove particulates and certain destructive compounds, such as sulfur and nitrogen oxide compounds, before contacting the carbon dioxide sorbent, for example where the gas is derived from the burning of coal.

Generally, with extraction directly from the atmosphere, and the capability to increase the concentration of carbon dioxide in the ambient air being treated, by admixing with a high $CO_2$-content gas mixture, such as flue-originated gases, one can reduce previously existing $CO_2$ concentrations, in the atmosphere, thus providing a combined carbon-negative process, and compensate for other greenhouse gases, such as methane, being added to the atmosphere that may otherwise increase their concentrations. It is now possible to thus reduce, or even reverse, climate change.

In our earlier work, it was realized that a highly efficient system for removing $CO_2$ from the relatively low concentration in ambient air could be achieved without requiring significant energy use to regenerate the $CO_2$-loaded sorbent, using saturated process steam. It has now been found that an improved result is obtained by utilizing an array of the relatively thin, large surface area, monolithic, porous substrate, as the support for the active sorbent sites, in tandem with each other. For such a system, substantial quantities of flue-originated gases can be mixed with the ambient air, to increase the concentration of $CO_2$ in the air being treated, by an order of magnitude, and possibly even more, while continuing to improve upon the low temperature efficiency previously achieved for ambient air alone, by varying the conditions and operating in tandem with another monolith system.

In such an improved system, the tandem pairs are phased such that when one of the pair is completing being regenerated in its regeneration box, the second member is just entering its regeneration box. The second regeneration box is sealed, as described in the copending application and again below, and the trapped atmosphere is exhausted from the second regeneration box, to below 0.4 BarA, and preferably below 0.3 BarA and optimally down to between 0.1 and 0.2 BarA. The first regeneration box, which had also had its air exhausted, has been regenerated with saturated steam, which condensed within the pores of the monolith as the $CO_2$ was stripped from the sorbent. When regeneration had reached its desired endpoint, the monolith contained hot, condensed water and the surrounding atmosphere in the sealed box, containing some steam vapor and remaining $CO_2$, had been increased to at least about 0.7 BarA. The interiors of the two tandem regeneration boxes are then interconnected, so that there is a sharp, quick change in the pressures towards equalization; the hot condensed water in the first monolith is vaporized at the lower pressure, and when the vapor encounters the second monolith, that is warmed and some $CO_2$ is released, while the vapor condenses on the second monolith; thus quickly cooling the first monolith and preparing it for movement out of the first Box and into contact with the $CO_2$-laden gas mixture. This tandem operation is continued for all members of the array in order to achieve a substantially continuous treatment of the $CO_2$-laden gas mixture, and continuously repeated.

It must be understood that a 'porous substrate' is one having open pores, where a gas or vapor can enter a pore at the front surface and exit from the rear surface, so that the gas or vapor can pass fully through the substrate thickness via the open pores. The thickness of the monolith is preferably at least an order of magnitude less than either of the dimensions of the monolith surface transverse to the direction of flow of the $CO_2$-laden gas mixture to be treated.

The term "ambient air", as used in this specification, means and includes unenclosed air under the conditions and concentrations of materials present in the atmosphere at a particular geographic location. The term "flue-originated gases" refers to gases containing a high concentration of $CO_2$ and exiting from the combustion of carbon-containing materials, such as so-called fossil fuels, including gases which may have been pre-treated after exhausting from the point of combustion.

It has been found that this process is successful with almost any admixture with ambient air that comprises at least a predominant quantity of ambient air, by volume, to dilute the flue-originated gases. The flue-originated gases will greatly increase the concentration of $CO_2$ in the mixture, as compared with the ambient air, and are fully mixed into the air by a system, for example, as shown in FIGS. 25 and 26 of the prior copending application, to form a substantially uniform, high $CO_2$-content gas mixture.

The $CO_2$ laden gas mixture, at ambient temperature, is treated by directing it through a sorbent structure comprising a relatively thin, high surface area, porous monolith, supporting active $CO_2$-sorbent sites, that can bind (capture) $CO_2$, and then regenerating the sorbent by causing the release of the sorbent $CO_2$ from the sorbent, by treating the sorbent structure with low temperature, preferably saturated, process steam, at a temperature of not greater than about 120° C., and withdrawing the released $CO_2$ (thereby effectively regenerating the sorbent structure) and obtaining high quality $CO_2$. The sorbent preferably exothermically adsorbs the $CO_2$ which allows for the relatively low temperature stripping of the $CO_2$ from the sorbent.

In this application, the substrate structure preferably comprises an amine that binds to $CO_2$, and which is carried by the substrate structure. The sorbent will be preferably held on the surfaces of the substrate, including the surfaces within the pores. It was previously thought that when carbon dioxide concentration was much above that of ambient air, the $CO_2$ sorbent temperature would be too high due to the exothermic heat from the adsorption of the $CO_2$, which would raise the temperature of the monolith. It is known that the effectiveness of the sorbent, in the presence of air, would be degraded, at such higher temperatures. It was expected the effectiveness for capturing $CO_2$, would be diminished, and would require a higher temperature to regenerate the sorbent.

It is known that the fraction captured by adsorption depends upon the temperature of the exothermic sorbent, in a way given by its Langmuir isotherm; for the available primary amine sorbents. The isotherm is exponential with temperature, because of the adsorbent's high heat of reaction with $CO_2$, i.e., about 84 kj/mole. For example, a temperature increase from 25° C. to 35° C. reduces the percent of amine sites that can capture $CO_2$, at equilibrium, by about $e^{-1}$. As a result, the ambient temperature in cold weather, i.e., winter in the mid or higher latitudes or elevations, reduces this problem, or allows a higher concentration of $CO_2$ to be treated. For example, if the ambient temperature is 15° C., a rise of 10° C. would yield the same performance as the 25° C. case ambient location treating a lower concentration of $CO_2$. The Langmuir isotherm for a primary amine is close to optimal at about 15° C. in terms of the fraction of amine sites in equilibrium and the sensible heat needed to strip and collect $CO_2$ from the sorbent, so as to regenerate the sorbent effectively at about 100° C. A conceptual design is shown in FIG. 27 of the prior copending application, where the effluent gas is fully mixed with the air through a suitable apparatus, and the temperature rise is analyzed.

A particularly efficient embodiment of this invention is achieved if it is integrated into a $CO_2$ generating process, such as a power plant, which includes a prior art treatment process, which at the least removes particulates and sorbent poisons, such as oxides of sulfur and nitrogen. Generally, most coal-burning plants in North America or Europe provide a post-combustion treatment using a process generally referred to as CSS technologies. One generally used such process is the so-called "post-combustion MEA process", as practiced by the Costain Group PLC, of England, and as shown diagrammatically in FIG. 3, showing its use in a coal fired power plant, and its treated effluent being passed to the process of the present invention. The effluent from the CSS Process, which is free of particulates and the usual poisons of the sorbent used in the process of the present invention, is admixed with ambient air for treating with the present process to capture the combined $CO_2$. The incremental cost per tonne of $CO_2$ removal by the CSS Process increases sharply as one increases the percent of $CO_2$ removed from the gas mixture and becomes very costly as one goes from 90% to 95% removal. On the other hand, as one reduces the percent captured by the CSS Process, alone, it often becomes costly because the penalty for the $CO_2$ not captured increases in situations where $CO_2$ emissions are regulated, thus reducing the value of the whole process. For these reasons the target for CSS is usually 90%.

On the other hand, the costs per unit amount of pure $CO_2$ captured by the process of the present invention are reduced as the percent of $CO_2$ in the process stream entering the process of the present invention increases; this is especially effective when combined with the effluent from such a CSS Process, or other flue gas pretreatment. As the concentration of $CO_2$ in the feed stream increases, however, the process of the present invention must provide the necessary cooling means to insure that the temperature rise from the exothermic capture of the mixed $CO_2$ does not cause the degradation of the effectiveness of the sorbent. There is thus an opportunity to optimize the cost per tonne of $CO_2$ captured by calibrating the relative effect of the combination of the CSS Process and the present invention by reducing the percent of $CO_2$ removed in the CSS stage—say if one backs off to 80% removal of $CO_2$ in the prior art CSS Process, and mixing the remaining relatively high $CO_2$ content CSS effluent (containing, e.g., 2% $CO_2$) with ambient air. In that case, for every 1% of that CSS effluent stream one mixed with the air, one would increase by about 50% the $CO_2$ concentration in the feed gas mixture into the process of the present invention.

The associated temperature rises can be determined, because the temperature rise depends on the rate of $CO_2$ adsorption and thus the concentration of $CO_2$ in the mixed process feed stream. If one mixed in 5% of the CSS effluent, it would reduce the capital costs for the process of the present invention by a factor of 3 (because the concentration is three (3) times higher in the mixed stream than in the air alone) over a stand-alone pure ambient air capture process. The temperature rise for that case is close to the rise when mixing the full flue gas stream version of the carburetor, or about 3.5° C. Most importantly, if the air capture process of the present invention were set to remove only 70% of the $CO_2$ from the mixed stream, the combined processes would remove over 100% of the $CO_2$ emitted by the power plant. It would thus produce carbon-free, or carbon-negative, electrical power or other product, having used the burning of fossil fuel as the energy source. In removing 75-80% of the $CO_2$, by the process of the present invention, from the mixed gases, the result would be a carbon-negative power-generating process.

Besides achieving direct benefits from reducing the cost per tonne of $CO_2$ collected, by having each process optimizing the cost of the other, there are also other benefits from process integration. These benefits include that the exhaust stream from the flue gas processing is clean, removing that problem/cost for the mixing step, and more efficient and lower cost use of energy. There are many different pre-combustion and post combustion $CO_2$ removal processes being pursued, other than the CSS Process, and new ones could well emerge in the future. The details of the amount mixed of the ambient air and the CSS effluent, and possible additional processing of the exhaust from the first stage flue gas process, will vary in detail but the basic advantages of the combined process remain qualitatively the same.

To allow for the capture from a higher concentration of $CO_2$, the present advance is based upon the discovery that allowing condensed steam, as water, to remain in the monolith pores after the stripping of the $CO_2$ is completed, rapid evaporation of a portion of the hot condensate liquid is a highly useful tool to rapidly cool the monolith. The stripped, cooled monolith is then returned to the $CO_2$-capture station and for a further sorption step, while conserving the heat by preheating the $CO_2$-loaded sorbent preliminarily to stripping. The monolith and sorbent would otherwise be undesirably heated during the sorption step, and thus would be more susceptible to degradation when exposed to the $CO_2$-laden air. This effect is most readily achieved in a monolith having a thickness, or length in the direction of the incoming air flow, of preferably not more than 10% of the largest other dimension of the monolith, e.g., a thickness of fifteen (15) centimeters, and a length or width of at least two (2) meters, by 0.5 meters, i.e., a surface area, transverse to air flow, of at least 1 meter square.

The rate of cooling the regenerated substrate can also be improved by pumping the regeneration box pressure down, e.g., preferably to less than 0.3 BarA, and most preferably to between 0.1 and 0.2 BarA, to remove most of the air before starting the flow of process steam through the substrate. This will also enhance the efficiency of the removal of high purity $CO_2$ by eliminating most non-condensable gas before the stripping of the $CO_2$.

In one of its basic aspects, this invention provides additional structures and techniques for capturing carbon dioxide from carbon dioxide laden air, and using process heat to separate carbon dioxide from a sorbent and regenerate the sorbent.

Moreover, in another of its aspects, this invention provides some additional structures and techniques that allow the efficient capture of carbon dioxide from higher concentrations of carbon dioxide in air, without forfeiting the use of low temperature process heat to separate the carbon dioxide from the sorbent and regenerate the sorbent. This invention further allows the capture, by sorption, of carbon dioxide from admixtures of air with flue gas and separation and regeneration. This allows a $CO_2$-generating primary system to be rendered net $CO_2$-negative, and thus reduce the amount of $CO_2$ in the atmosphere.

In addition, this invention provides a relatively low cost and relatively pure source of $CO_2$ for such beneficial uses as feeding algae farms for biofuel production, where the capture costs represents the entire cost of the $CO_2$ supply.

In another embodiment, intended to further improve the performance and efficiency of the system, the regeneration chamber box is constructed so that the back wall (the gas collection side-opposite to the steam injection side) of the regeneration Box 3051 acts as a condenser of any steam passing through the monolith as vapor. If the wall is cooled by circulating water or has enough thermal mass to remove the heat, and then be cooled by air, than the steam will condense on the cool surface, forming water, by transferring its latent heat to the wall. Additional savings are achieved by eliminating an additional heat exchanger. If the back wall is kept at 40° C. or below, by cooling its thermal mass, then the back wall will function as a pump, by reducing the temperature in the closed regeneration box. The inner surface of the back wall can be provided with downwardly slanted ribs, to direct the condensed water to the side edges of the box, so as to prevent a large build up of condensed water on the back wall; such a buildup would slow the cooling. Such a system provides an efficient way to cool the monoliths for the following reasons: 1) it can be done quickly; 2) no additional capital expense is required for separate condenser; and 3) no need to pump water vapor for evaporative cooling, saving a lot of energy.

Although the processes of the present invention are best utilized in colder climates, in order to optimize the effective regeneration of the sorbent, while limiting any potential loss of effectiveness, the difficulty is that in the coldest climates, i.e., at the highest latitudes, there are very few preexisting plant facilities to which to attach the $CO_2$ capture process. It has been realized now, however, that due to the greater efficiencies at such locations there is a basis to provide a stand-alone plant where there are no other facilities to provide either enhanced $CO_2$ concentration or to provide the necessary process heat. A system, in accordance with this embodiment, provides a stand-alone unit which has no accessibility to external process heat or electricity and exists in a colder climate having extremely low temperatures such as the arctic region. The lower the temperature, substantially without limits, will result in a more efficient operating system. As the system is wholly contained, even conditions in an area such as in the Arctic, susceptible to extreme cold and frozen precipitation, should not interfere with the operation of this system. This will be especially true where the system is operating adjacent to or near a long distance pipeline carrying, for example, crude oil or natural gas from, e.g., the far North, to those areas of human habitation where it would generally be more likely useful.

In accordance with one embodiment of the present invention, a system including a generator of heat such as a boiler is connected to an electrical generator to operate the necessary auxiliary systems, e.g., an elevator system, the necessary control devices, valves, and compressor pumps, for the highly pure $CO_2$. The high temperature heat is used to generate high pressure steam to operate the electrical generators, and the flue gas exhaust is utilized by admixing with ambient air so as to proceed in accordance with the earlier-described system. In this manner, the heat and other energy is provided to operate the system and, for no additional cost, the ambient air is further enriched by $CO_2$, so as to allow for a more efficient capture of the combined $CO_2$. Such a system can be almost revenue neutral (but almost always $CO_2$-negative) even where there are energy costs, as long as there is a market or a use for the pure $CO_2$ that is generated. For example, in the circumstance of a long distance pipeline, the purified $CO_2$ can be at least partially stored adjacent the pipeline. In the event of any accidental fire or leakage, the $CO_2$ can be used to snuff out most blazes that can erupt.

It is noted that there may be situations where the value of the purified $CO_2$ is in fact greater than the cost of the fuel for the electricity generation at a particular location. In that circumstance, for example immediately adjacent a pipeline or a high latitude natural gas well, the more energy that is used and the more flue gas generated, the greater the value of the ultimate process for the generation of the pure carbon dioxide. In this case, the greater surprise happens where it is more valuable to use as much energy as possible and thus generating more $CO_2$, rather than to conserve energy in what would be a more common situation. It is unlikely that such a situation would ever exist outside of the higher latitude, but, in that case (such as winters in mid-latitudes), this embodiment would be of great utility.

The substrate for the sorbent can be a monolith, formed, for example, of a silica material, such as cordierite, or an alumina structure, or from a polymeric material having intrinsic adsorption sites, such as a polymer having primary amine side groups. Generally the cordierite monolith would be expected to require more heat than the alumina substrate. In the situation where the $CO_2$ has the enhanced value, a greater profit would then be made.

In operation, a system embodying this energy enhanced process will use a high temperature heat source and micro turbine to generate the necessary electricity. The lower temperature heat discharged from the turbine will be used to regenerate the $CO_2$ sorbent. The feed stock to the $CO_2$ sorbent would comprise a mixture of ambient air plus the exhaust from the heat source. Where the heat source is natural gas there might be very little necessity to pre-treat the exhaust before feeding into the adsorber. However, if coal or fuel oil is used, some initial mitigating pre-treatment would be necessary in order to remove particulate material, which would otherwise clog the substrate pores, as well as to remove certain by-products such as sulfur and nitrous oxide, which might otherwise poison the sorbent.

In computing the cost effectiveness of any system of this invention, the following equations can be utilized, where $CE/T$ equals Cost of Energy Per Ton of $CO_2$ $CE/MMBTU$ equals Cost of Energy Per Million $BTU$, i.e., $1.055 \times 10^9$ joules $\times \dfrac{1}{CE}$ $E/T$ equals Energy Needed Per Ton of $CO_2$, measured in $MMBTU$ $CO_2/MMBTU$ equals quantity of $CO_2$ emitted per million $BTU$.

$REV$ equals revenue per ton of $CO_2$

When computing the operational costs of the system, the capital costs of the boiler and electrical generation shall be ignored and it will be assumed that there is no extra capital expense for the fuel generated $CO_2$, just the cost for the fuel. Assuming the case of SH/HR equals 1.2, which translates into E/T equals 4 MMBTU and REV equals $40.00 per ton for natural gas, CE/MMBTU equals $3.00; $CO_2$/MMBTU equals 53 kg so that CE/T equals 4×3 minus 40×4×0.053 equals $3.50 per ton.

For coal, on the other hand, the cost of energy per million BTU is highly variable but can be assumed equal to $2.50; the $CO_2$/MMBTU equals again 0.092 so that the CE/T equals 4×$2.50 minus 40×4×0.092 equals $7.60 per ton. Interestingly, the cost of electricity would be equal to the percentage of $CO_2$ added from the flue, i.e., 21% in the case of natural gas and 37% in the case of coal.

Further, for remote locations for EOR and merchant gas markets, revenue should be far greater than $40.00 per ton, thus further reducing the net cost of any energy provided, assuming that the marginal cost for producing the additional $CO_2$ is low. By utilizing the high temperature energy to produce electricity and the process heat to strip $CO_2$ from the sorbent, the economics become extremely favorable.

These and other features of this invention are described in, or are apparent from, the following detailed description, and the accompanying drawings.

BRIEF DESCRIPTION OF THE FIGURES AND EXHIBITS

Figure 4:
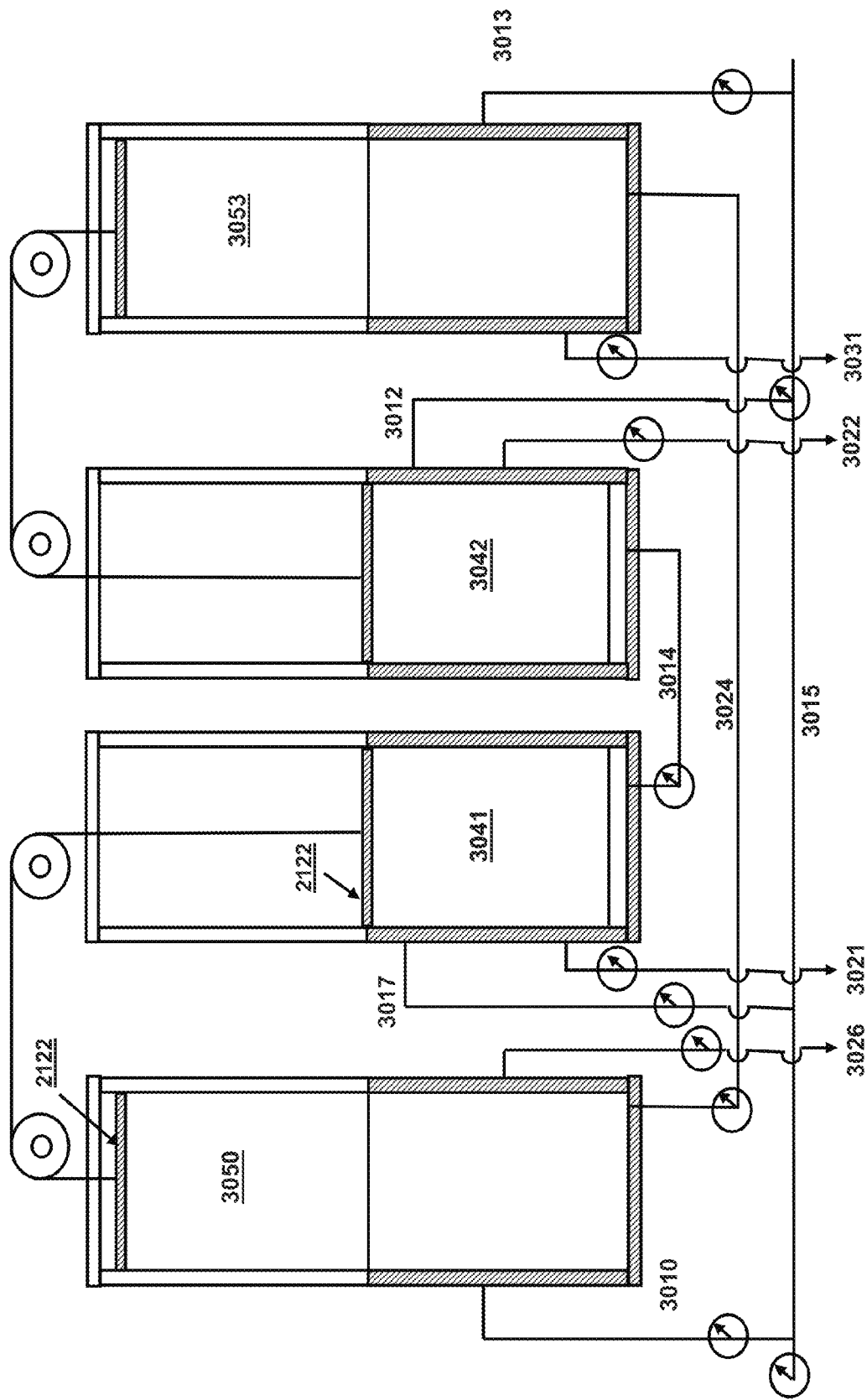
Figure 5:
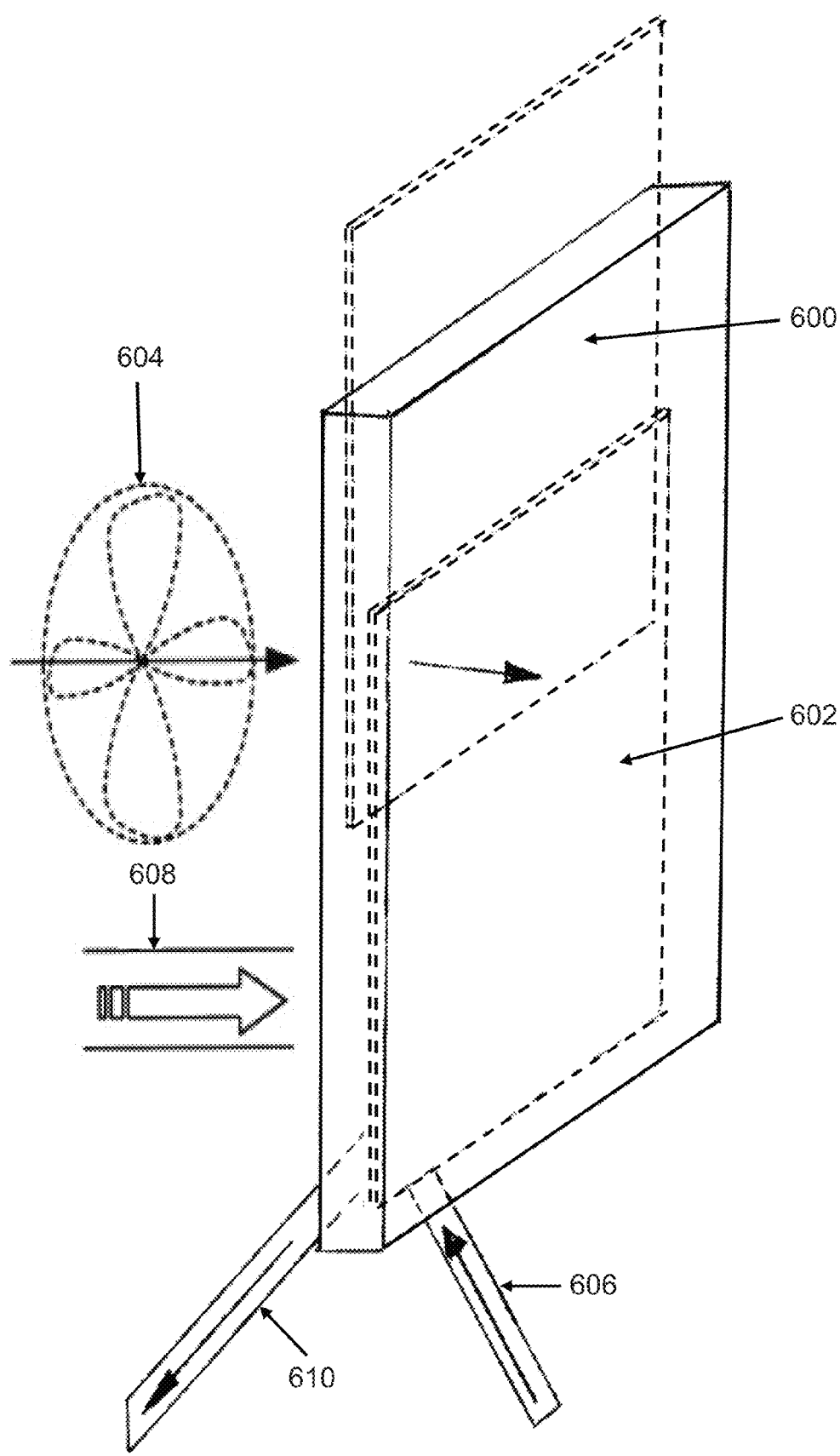
Figure 6:
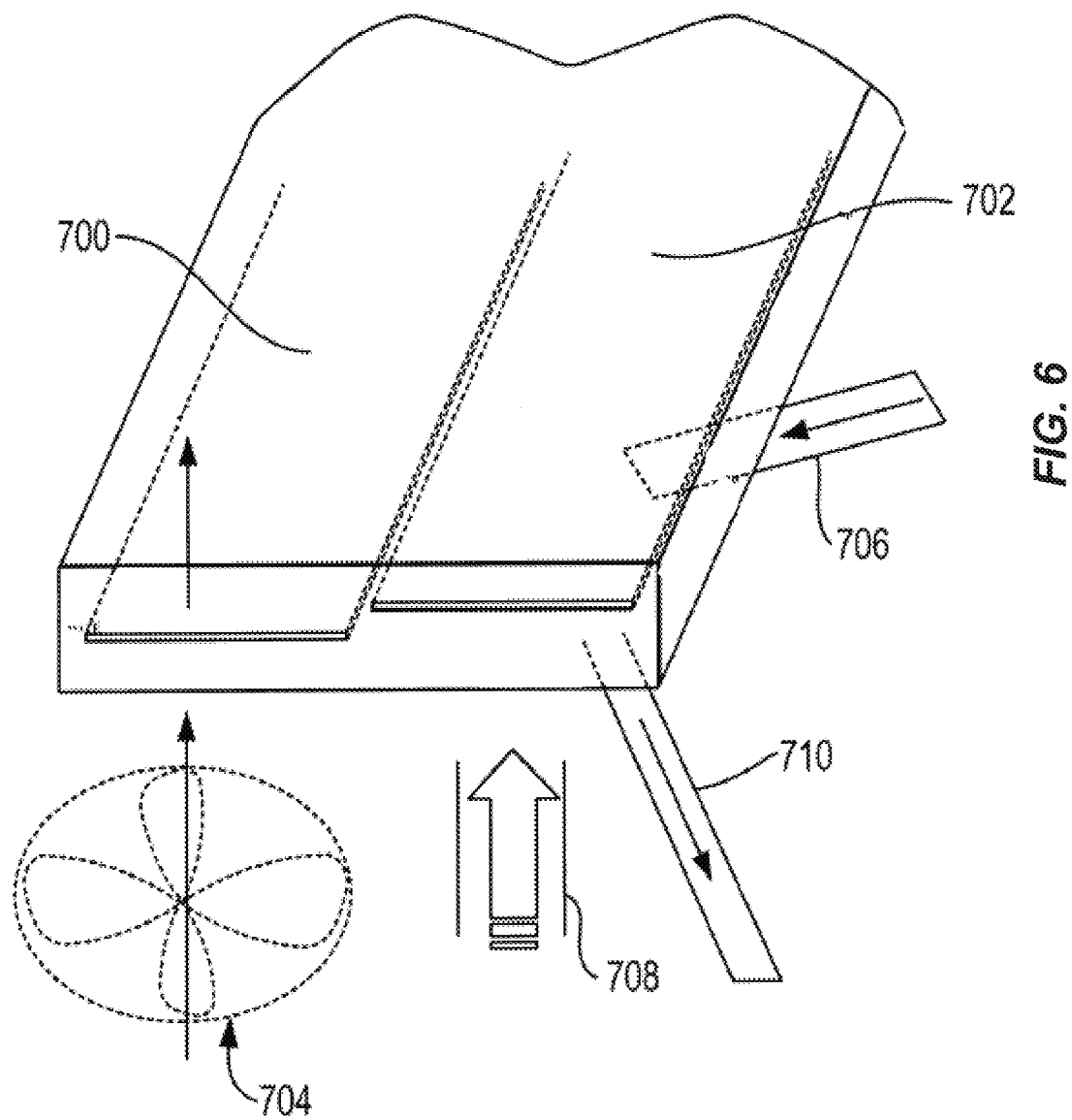
Figure 7:
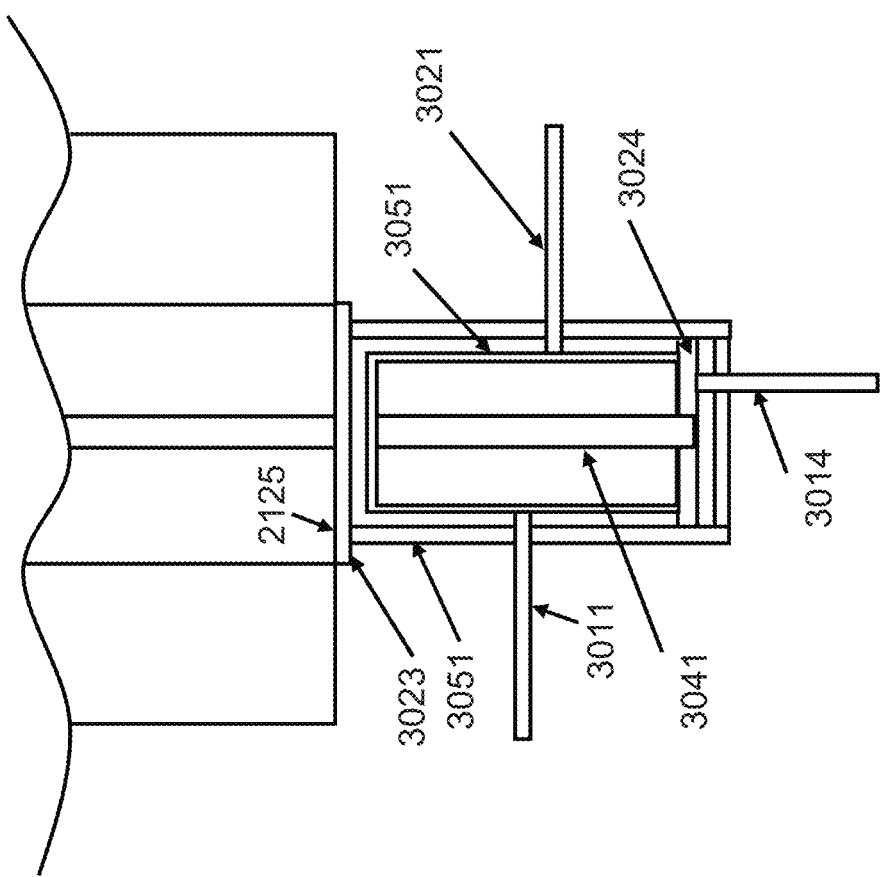

FIG. 4 schematically illustrate the preferred tandem version of a system and technique for removing carbon dioxide from carbon dioxide laden air, and regenerating the sorbent that absorbs or binds the carbon dioxide, according to the principles of the present invention; where Absorption Time is approximately equal to Regeneration Time to achieve the greatest efficiency;

FIG. 5 is a schematic illustration of a vertical version of a monolith medium for removing carbon dioxide from an atmosphere and for removing carbon dioxide from the medium, utilizing a vertical motion system or elevator to move the monolith between the upper air contact position (where the air movement is aided by a mechanical blower) and the lower regeneration position;

FIG. 6 is a schematic illustration of a horizontal version of a monolith medium for removing carbon dioxide from an atmosphere and for removing carbon dioxide from the medium, utilizing a horizontal track; and FIG. 7 schematically shows a cut-away side view of one of the tandem systems elevator structures of FIG. 4, showing the monolith in the regeneration chamber.

Figure 8:
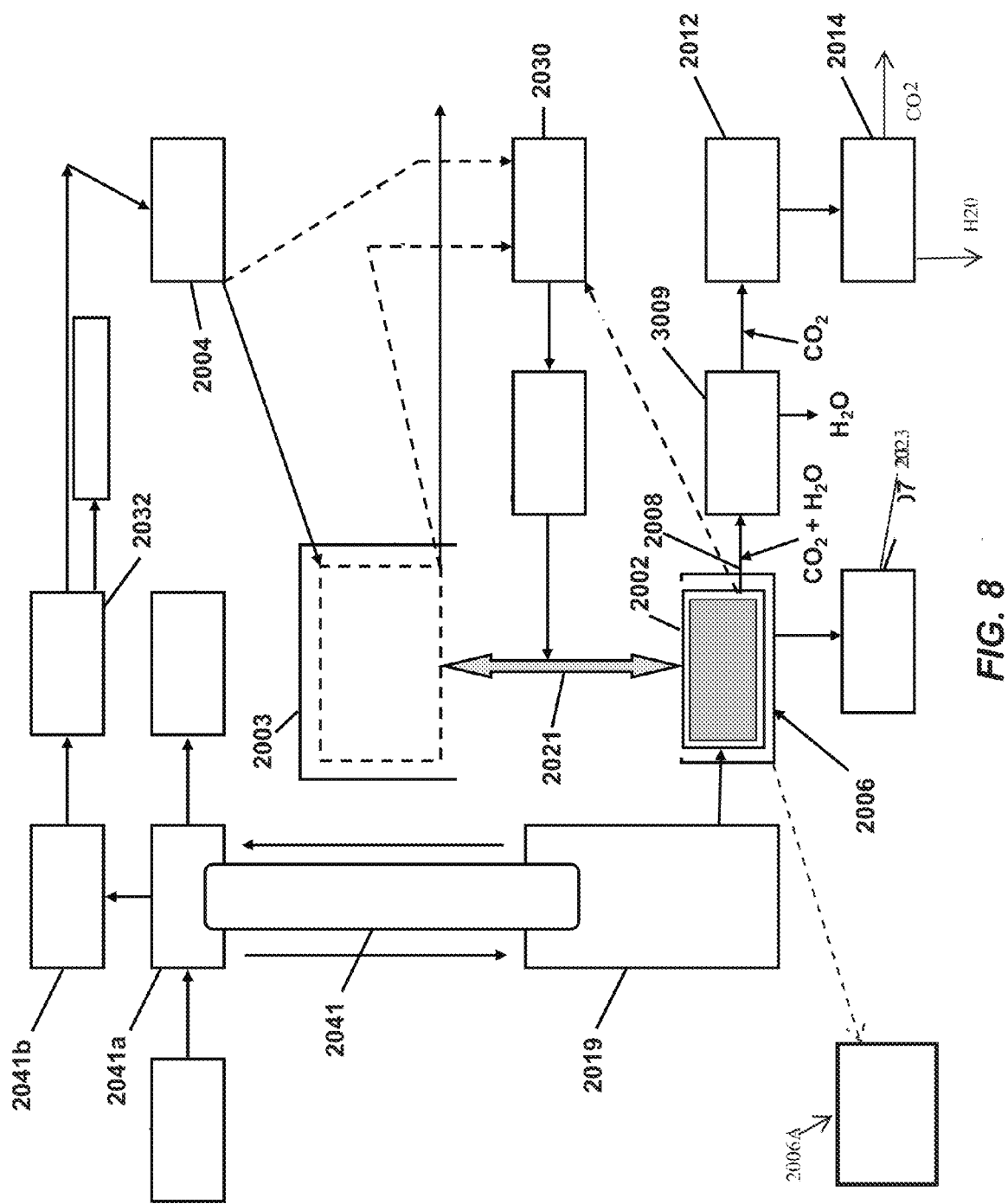

FIG. 8 is a schematic illustration of a carbon dioxide removal system, originally shown in the incorporated prior application Ser. No. 13/098,370, showing one of the added tandem pairs of carbon dioxide removal structures forming a part of the present invention.

DETAILED DESCRIPTION OF INVENTION

Background Description of the System and Method Concepts of application Ser. No. 13/098,370—Following the system shown in the copending application (U.S. Pat. Ser. No. 2011/0296872), the following preferred embodiments of the present invention have been found to allow for the treatment of more highly concentrated gas mixtures of $CO_2$. By following the process described herein, ensuring that the substrate meets the requirements set forth in this description, a concentrated $CO_2$ mixture can be successfully treated, efficiently and at low cost, so that not only are the greenhouse gases from, e.g., a power plant, completely removed from the atmosphere, but the present process will result in a net carbon-negative effect, withdrawing more $CO_2$ from the atmosphere than the plant emissions, and thus resulting in an overall reduction of $CO_2$ in the atmosphere.

$CO_2$ laden air is passed through the sorbent structure, which is preferably shaped so that the dimension in the direction of the air flow is much smaller, e.g., at least one and preferably at least two orders of magnitude smaller than the other two dimensions defining the surfaces facing in the path of the air flow. The $CO_2$ binding sites on the surfaces of the substrate structure, e.g., primary amine sites, must be able to spontaneously bind the $CO_2$, usually meaning that it is an exothermic reaction at ambient conditions, until the sorbent structure reaches close to the saturation level; this can be determined, for example, by measuring the concentration of $CO_2$ of the air exiting the sorbent structure, known as the breakthrough amount.

When the desired $CO_2$ breakthrough amount is reached, the sorbent structure is removed from the carbon dioxide laden air stream and isolated from the atmosphere, in a sealed regeneration chamber, and the $CO_2$ is stripped off and the sorbent structure regenerated, in a manner described further below, by being exposed to process heat in the form of low temperature, saturated (at ambient pressure) steam passed through the sorbent structure. The steam will initially condense and transfer its latent heat of condensation to the sorbent structure, heating the structure until the temperature is reached at which the $CO_2$ is stripped from the adsorbent sites and is pushed out of the substrate structure by the steam, as it passes from and through the front part of the sorbent structure until the entire sorbent structure will reach a uniform elevated saturation temperature. As the steam contacts and heats the sorbent, it condenses on the monolith, for each approximately two (2) moles of steam that condenses it provides sufficient latent heat needed to liberate, or strip, one (1) mole of the $CO_2$ from the primary amine sorbent and push out the $CO_2$ from the sorbent structure; an exhaust fan/pump can also be used to collect and remove $CO_2$ from the regeneration chamber, as the $CO_2$ is stripped off. This technique is referred to as "steam stripping" and is also described further below. For energy efficiency and cost reasons, it is desirable to minimize the amount of steam used and that is mixed in with the $CO_2$ effluent, and to reclaim the hot condensate to be reheated to steam. Thus, whatever is (or can be) condensed, upon exiting the regeneration chamber, the condensate can be added to that generated in the regeneration chamber, and recycled to be heated and converted back into steam for further use.

The stripping process usually will be terminated at the onset of steam breakthrough, when the amount of uncondensed steam emerging from the backend of the sorbent structure becomes large compared to the newly stripped $CO_2$. The exact conditions for terminating the injection of new steam will be determined by balancing the increased fraction of $CO_2$ removed with the increased cost of energy as the steam process becomes less efficient in terms of the ratio of $CO_2$ liberated per quantity of steam used. That energy needs to be replaced when the steam and condensate are reheated for the next stripping cycle, i.e., the energy requirement to maintain the equality of the $CO_2$-capture time and the $CO_2$-stripping and cooling time.

The System

In designing the structure of the system incorporating the present invention to be commercialized, the following design parameters should be considered. In general as one increases the loading of the sorbent sites on the substrate, one also wants high amine efficiency as defined by the fraction of amine sites present that are available to bind the $CO_2$. This is the reason for preferring primary amines and also for adjusting the loading so as to minimize pore blockage by excess sorbent. Experimental results indicate that the optimum loading that balances amine efficiency with increased loading is between 40-60% by volume organic amine content relative to the porous substrate/skeleton to which it is attached or onto whose pore surfaces it is deposited. This can be determined by the following calculation, where:

Pcm=Density of the skeleton material (e.g., silica or alumina), in kg/cubic meter PORc=Porosity, the ratio of the open wall area to the total surface area perpendicular to the direction of air flow PUR=Ratio of $CO_2$ released to trapped air, purity of $CO_2$, RH=heat of reaction;

SH/RH=Ratio of sensible heat to heat of reaction RH during regeneration

Savc=Surface area per volume of the skeleton, in 1/meters squared of surface/meters cubed SH=sensible heat TA=Time to fill to saturation with $CO_2$, time for adsorption, TS=Time to regenerate using steam stripping, w=skeleton pore wall thickness d=average pore/channel size These are important design parameters to be considered in the design of this process. In this model, for ease of calculation, PORc is equal to the ratio of the average open channel area to the total average area, ignoring the tortuous nature of the curves in the channels of the walls of the porous medium. Thus, $PORc=d^2/(d+w)^2$. The surface area per volume is given by $Savc=4\,d/(d+w)^2=4\,PORc/d$. The pressure drop is dependent upon the size of the openings in the channel, the void fraction of the monolith, length and velocity of air flow through the pores.

Sorbent Structure and General Operation of Sorbent

One example of a type of substrate that can be used is a silica monolith, produced by Corning, under the trademark CELCOR®. That monolith can be used as the support for a sorbent structure, in accordance with the principles of the present invention. The sorbent (e.g., a primary amine, such as) is carried by (e.g., coated or otherwise immobilized on) the inside of one or more of the CELCOR®, cellular ceramic substrates, which provides a high surface area and low pressure drop, as $CO_2$ laden air flows through the substrate. The sorbent monolith structure can comprise, e.g., a plurality of the CELCOR® cellular, ceramic substrates, stacked as bricks, or a single monolithic substrate, described for example in connection with the copending applications. Other examples include the substrate and sorbent disclosed in published application US2011/0179948, or as described in a journal article by Choi et al, *Amine-Tethered Solid Adsorbents Coupling High Adsorption Capacity and Regenerability for $CO_2$ Capture From Ambient Air*, by Sunho Choi et al, CHEMSUSCHEM 2011, 4, 628-635 (2011 Wiley-VCH Verlag GmbH& Co. KGaA, Weinheim).

The $CO_2$ laden air is directed through the pores of the sorbent structure. It is also contemplated that the sorbent structure can be formed by embedding the sorbent material in an, e.g., alumina coating on the walls of the CELCOR® cellular, ceramic structure to form a monolithic sorbent structure.

It is also noted that an even more preferred structure is formed of bricks of porous alumina, in place of the silica of cordierite. Although the alumina structure is not physically and/or thermally as robust as the silica structure, the less rigorous conditions met in this ambient temperature capture process, and relatively low temperature stripping process, allow the use of the less robust structure. In addition, it should be noted that the substrate, in addition to the above ceramic structures, inorganic materials, the sorbent structure can be an organic material such as is formed from a polymerized polyamine by cross-linking the amine polymer to form a solid polymer, the solid polymer should be capable of being extruded at low enough temperature that the polymer does not volatilize, nor be softened at the temperature of the stripping steam, i.e., at up to 120° C., used for regeneration of the sorbent.

In general as one increases the loading one also wants high amine efficiency as defined by the fraction of amine sites present that are available to bind the $CO_2$. This is the reason for preferring primary amines and also for adjusting the loading so as to minimize pore blockage. Experimental results indicate that the optimum loading that balances amine efficiency with increased loading is between 40-60% by volume organic amine content relative to the porous substrate/skeleton to which it is attached or into whose pores it is deposited.

If Ns is the number of $CO_2$ binding sites per square meter of pore surface, Av is Avogadro's number, and if the density of the material of the skeletal structure is Pcm, the porous skeleton will have a density Pc given by Pc=(1−PORc) Pcm; then the loading L in moles per kilogram of sorbent structure is given by $$L=NsSavc/AvPc=4NsPORc/AvdPcm(1-PORc)$$

If one solves the above expression for PORc, one finds $$L=(4Ns/AvPcm)(1/(2w+w2/d))$$

Since it is desirable to maximize the loading of $CO_2$ adsorbed by the structure, the polyamine sorbents provide the desired high Ns. In any case the above analysis makes clear that it is preferred to have as thin walls as possible, between the pores/channels in the porous support. The loading in moles/kg is to first order, independent of the size of the pores, with the decrease in Savc, as the porosity is increased by making the pore size larger, cancelled to first order by the decrease in the density of the porous support, Pcm.

One can insert the values for Av and for Pcm of 2,500 Kg/m3 (note: averaging the difference in the values for quartz and fused silica) and convert Ns to Nsn which is the number of attachment sites per square nanometer, where
w and d are in nanometers, to find: L=1.33 (Nsn/w(1+w/2d) moles/kg, of the skeleton structure. For Nsn=5 sites per square nanometer and w=2 nanometers, a porosity of about 0.5 results in a surface area per gram of 400 mm$^2$, or 160,000mm$^2$ and L=2.5 moles/kg. of the skeleton structure.

The actual loading capacity of $CO_2$, as kg/m3 of air input, Ld/a, where the thickness of the support wall is We and the length (in the direction of airflow) of the monolith is Lm is given by Ld/a=L(0.044)(Pcm(1−PORc)) Savm We Lm, which substituting for L, $$Ld/a=(NsSavc/Av\ Pcm(1-PORc))\times(0.044)(Pcm(1-PORc))\times Savm\times We\times Lm;$$

$$Ld/a=Ns(0.044)/Av)(Save\times Savm\times We\times Lm),\ \text{Substituting for }Savc,$$

$$Ld/a=Ns(0.044)/Av)\times(Savm\ We\ Lm)\times(4/d(1+w/d).\text{sup.}2).$$

In one example, using the Corning 230 cell CELCOR monolith, the pore flow length Lm is 0.146 meter, the surface area per volume of the monolith Savm is about 2000 m2/m3 and the pore wall thickness of the monolith Wm is 0.265 mm., determined from Ld/a=L (0.044 kg/mole) (Pc Savm 0.146 Wm), for an amount of $CO_2$ in kg/m2 area of air input. A general design criteria is to make L and Ld/a as large as possible, constrained by the pressure drop constraint, i.e., limited by the force of the wind and/or fan array, which is met in the first embodiment of the present invention using modeling results for the Savm of the 230 cell Corning monolith, and the pore length, in the direction of air flow, of 0.146 m and input air flow velocity of 2.5 m/sec.

The walls of the monolith should have the desired PORc, and number of attachment sites to provide a high Nsn. Wm is determined based upon optimizing (minimizing) the pressure drop/Savm, which in turn will be constrained by a limit of how small one can make Wm to have acceptable loading, based upon other constraints (see below). It should be noted that L increases as w decreases, and d increases, but Ld/a decreases, with increasing pore size for a fixed w, because as the porosity increases Pc decreases. In general terms, the optimal design has the smallest w possible, and a porosity that balances the impact of the pore size on the performance parameters described below. It must be remembered that the amine compound may be impregnated as a liquid in the pores of the monolith as well as, or in lieu of, being supported on the walls of the pore structure.

Air capture following the present invention, is a relatively mild condition. This feature of the present invention allows the use of a much less robust structure for the monolith. In particular this permits the use of relatively thin walls made out of material with high porosity on to which sorbent is deposited; one such material is alumina. This will save in cost, using materials that are generally less robust and therefore less costly to manufacture. To prevent degradation of the sorbent, it is necessary to cool down the regenerated monolith to below 70° C. before exposing it to air (oxygen), during the sorption stage. The cool down must be done quickly to maximize the time the monolith is adsorbing $CO_2$. The large amount of heat (about $10^9$ joules for the current silica system—only about ⅔ as much is required for the alumina case) that needs to be removed in a short time, i.e., 10 to 20 seconds, in the presence of non-condensables, is very challenging; as a further challenge, economics requires avoiding the need for a large condenser with fast water flow. Although this could be shared with several units, spreading out its cost, it would have a cost impact and not be that efficient for heat recovery. In addition, the following solution also has positive impacts on steam and water use and $CO_2$ purity. Furthermore, this concept works for sorbent systems that act in tandem, when using higher concentration gas mixtures, but can also be adapted for the single sorption systems operating on ambient air only.

In this system, as shown in FIG. 4, sealed Box 3051 contains Monolith array 3041 that has just completed steam regeneration and $CO_2$ capture, and has a steam off-pressure of about 0.7 to 0.8 BarA, most of the $CO_2$ having been withdrawn through line 3021, which line has been closed. At that time, Box 3052 contains Monolith array 3042, which has been lowered (after sorbing $CO_2$ from the air mixture) into the regeneration Box 3052, and Box 3052 is being pumped out to lower the pressure in the Box 3052 to 0.1 BarA, which allows for a saturated steam temperature of 45° C. By lowering the box pressure, the ultimate result will be greater purity of the $CO_2$ stripped from the regenerated sorbent because the amount of air, of course, is only 10% of the original 1 BarA atmosphere. The cost to pump the box of air down to the desired pressure when using electricity is less than 10% of the cost to move the air at 100 pascals pressure drop.

An additional amount of steam may be added to Box 3051 to push out most of the remaining $CO_2$ in the box using the force of the steam, which also forces some additional condensate to collect in the pores of Monolith array 3041. When Box 3051 is exposed to the low pressure of Box 3052, through the line 3014, any steam and hot condensate in Box 3051 will suddenly expand and evaporate, creating an initial steam burst into Box 3052. The Box 3051 outlet line 3014 (when Box 3051 and Box 3052 reach equilibrium) is closed off and Box 3052 is put into connection with the steam distributer input pipe 3012. This steam burst from Box 3051, being added to Box 3052 condenses on the cooler Monolith array in Box 3052, raising its temperature. The steam burst also serves to quickly cool Monolith array 3041, as the condensate evaporates and any steam expands. The velocity of this initial steam burst from the water evaporating from Box 3051 Monolith array is designed to reach a velocity of at least 10 times faster than the air flow speed, or 0.5 mps. The two connected boxes, Box 3051 and Box 3052, reach an equilibrium at a temperature lower than $T_{regen}-T_{air}/2$, because a portion of the heat will be removed by the stripped $CO_2$ from Box 3052.

The connection 3014 between Box 3051 and Box 3052, when the lower temperature is reached in Box 3051, is then closed and process steam is introduced through line 3012 into Box 3052 and the pressure is allowed to increase to 0.7-0.8 BarA, the process steam strips the $CO_2$ from the Monolith array 3042. The process steam heats the Monolith array to the $T_{regen}$ temperature and, when the collection of $CO_2$ drops to a lower rate that signals completion of the regeneration of the sorbent in Box 3042. After the initial steam burst from Box 3051, the lower pressure in Box 3051, which resulted from the evaporation of the hot condensed water on the Monolith array 3041, also quickly reduces the temperature of the Monolith array 3041 to below 70° C., which allows for the introduction of air to further cool the Monolith array 3041 down to its adsorption operating temperature, which is substantially the ambient temperature. The cooled Monolith array 3041 is being raised, as it is air-cooled, to the adsorption position, receiving fresh $CO_2$ laden air or mixed high concentration gasses. This cycle is repeated in reverse, as Monolith array 3042 becomes fully stripped and Monolith array 3041 returns from the air capture zone into sealed Box 3051.

In addition to the greatly reduced cooling time, the advantages in water and heat usage are clear, saving both by at least a factor of 2. Substrates provide a very good heat sink because of their large surface area and thin pore walls. The concentrated carbon dioxide and condensed steam in Box 3052 from Box 3051 is removed from Box 3052 via line 3022 to a capture vessel and the valve in line 3022 is closed and steam passed into Box 3052 from line 3012.

Although the present silica-based Monolith array, i.e., cordierite, has sufficient thermal conductivity, an alumina Monolith array will have further improved conductivity and, thus, will result in even faster cooling when combined with the evaporation of condensed water in Box 3051 and the condensing of the steam burst on Box 3052. It has been shown that the heat change effect is $10^9$ joules, resulting in cooling of Monolith array 3041 within 10 seconds to a temperature below 70° C. This method avoids any additional cost for a separate water-cooled condenser, and water, of course, beyond that used for the process steam, is unnecessary.

It is desirable to minimize as much as possible the time during which no $CO_2$ adsorption is occurring, in either the Monolith array 3041 or Box 3042 Monolith array. This is achieved by operating two sets of monolith arrays in tandem, preferably side by side, so that the cycles for the two boxes can be placed in phase so that when one is adsorbing, the other is being regenerated, so as to allow the cooling of one to create the heating of the other, as explained above. This results in the shortest period during which no adsorption is occurring in both monolith arrays, and, in fact, members of the pair are preferably limited to slightly more than 10 seconds, per cycle for the cooling step. The treating of a higher concentration $CO_2$ gas mixture can be more successful when this double tandem cycle is in use.

As a further energy and apparatus saving, as shown in FIG. 4, the tandem pairs can act as elevator counterweights for each other, thus reducing the amounts of energy needed for each raising and lowering cycle, while also reducing the number of elevator systems, including motors and counterweights, needed if a more conventional counterweight system were used. Such a system, however, does require careful equalizing of the time needed for each of the capturing and stripping cycles, including heating and cooling of the monolith array, and capturing and stripping of the $CO_2$.

Figure 1:
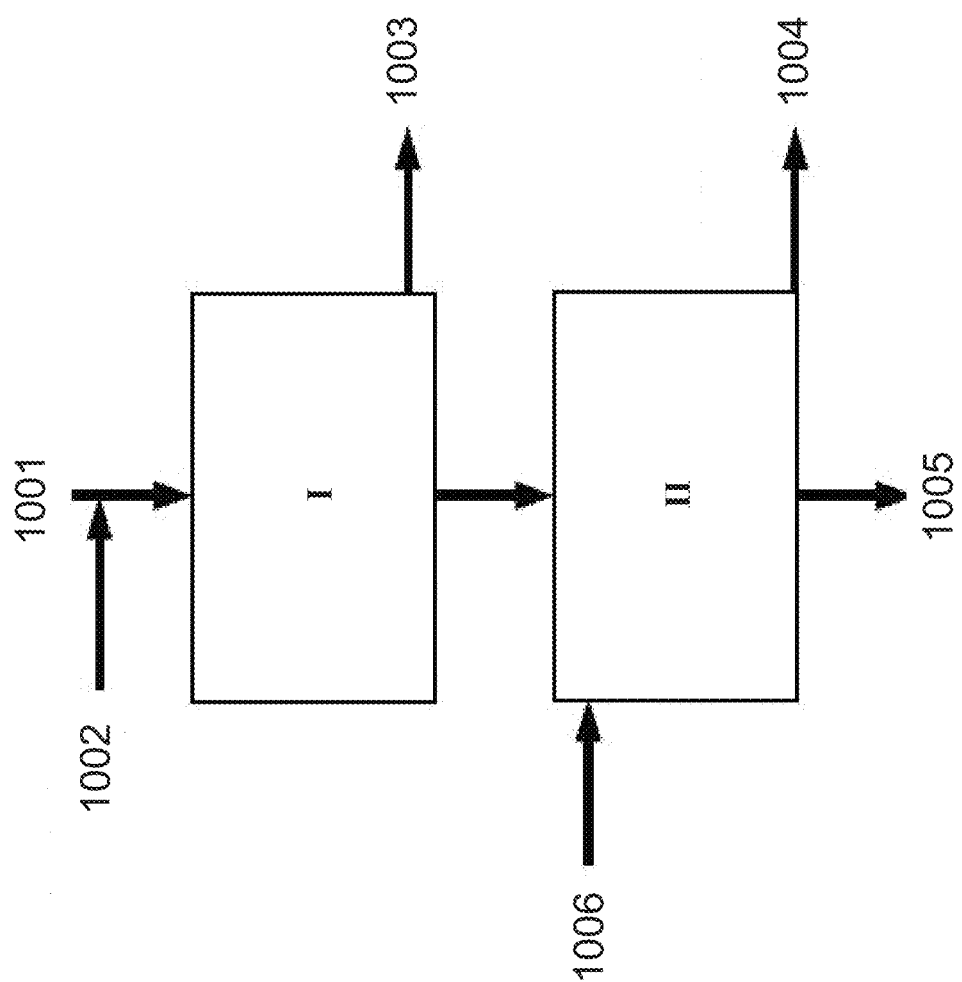
FIG. 1 is a block diagram of a system for removing carbon dioxide from the atmosphere according to an exemplary embodiment of this invention.
Figure 2:
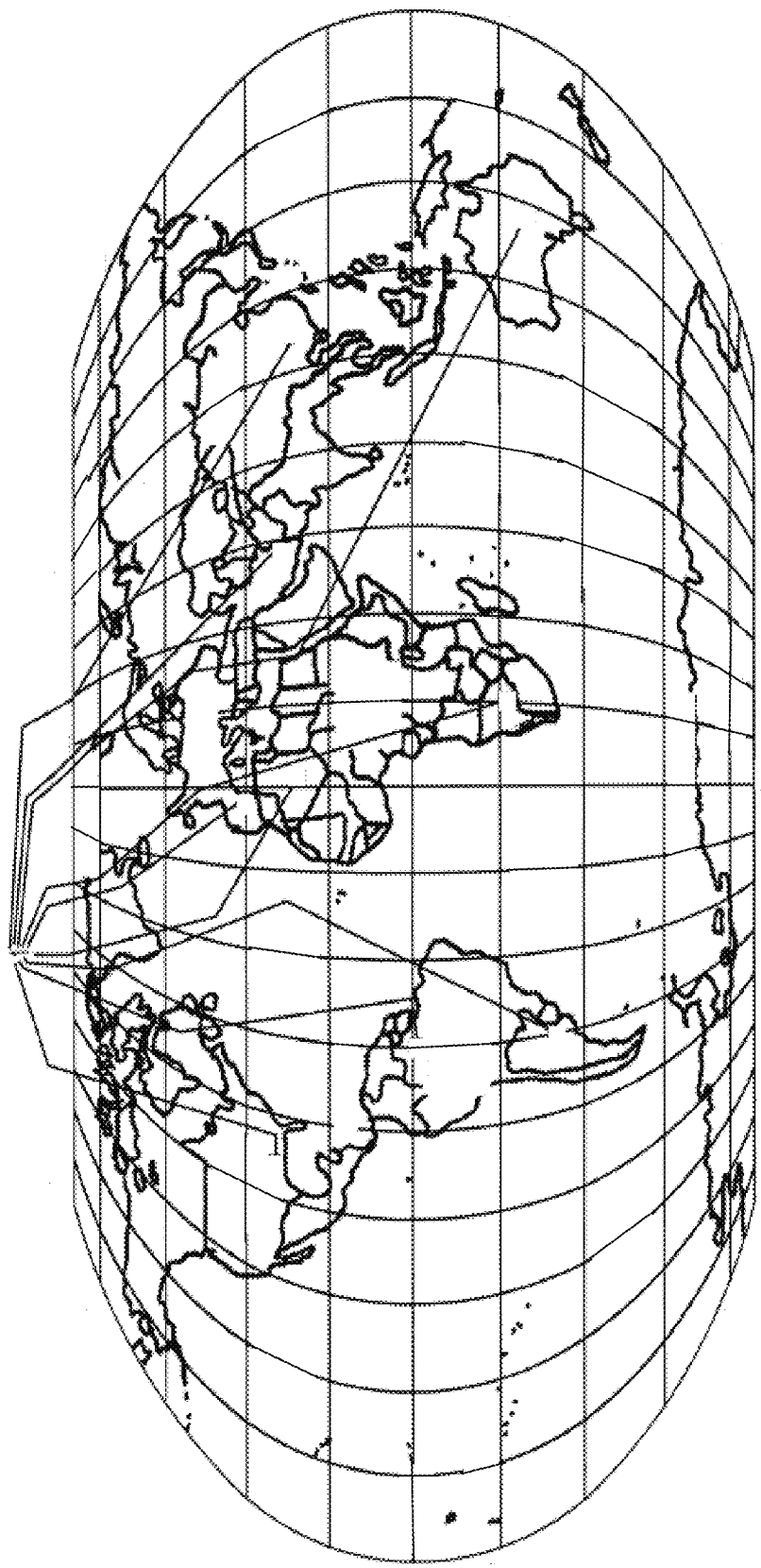
FIG. 2 is a map illustrating a global system of multiple units, suitable for acting as a global climate modification system, according to an exemplary embodiment of the present invention.
Figure 3:
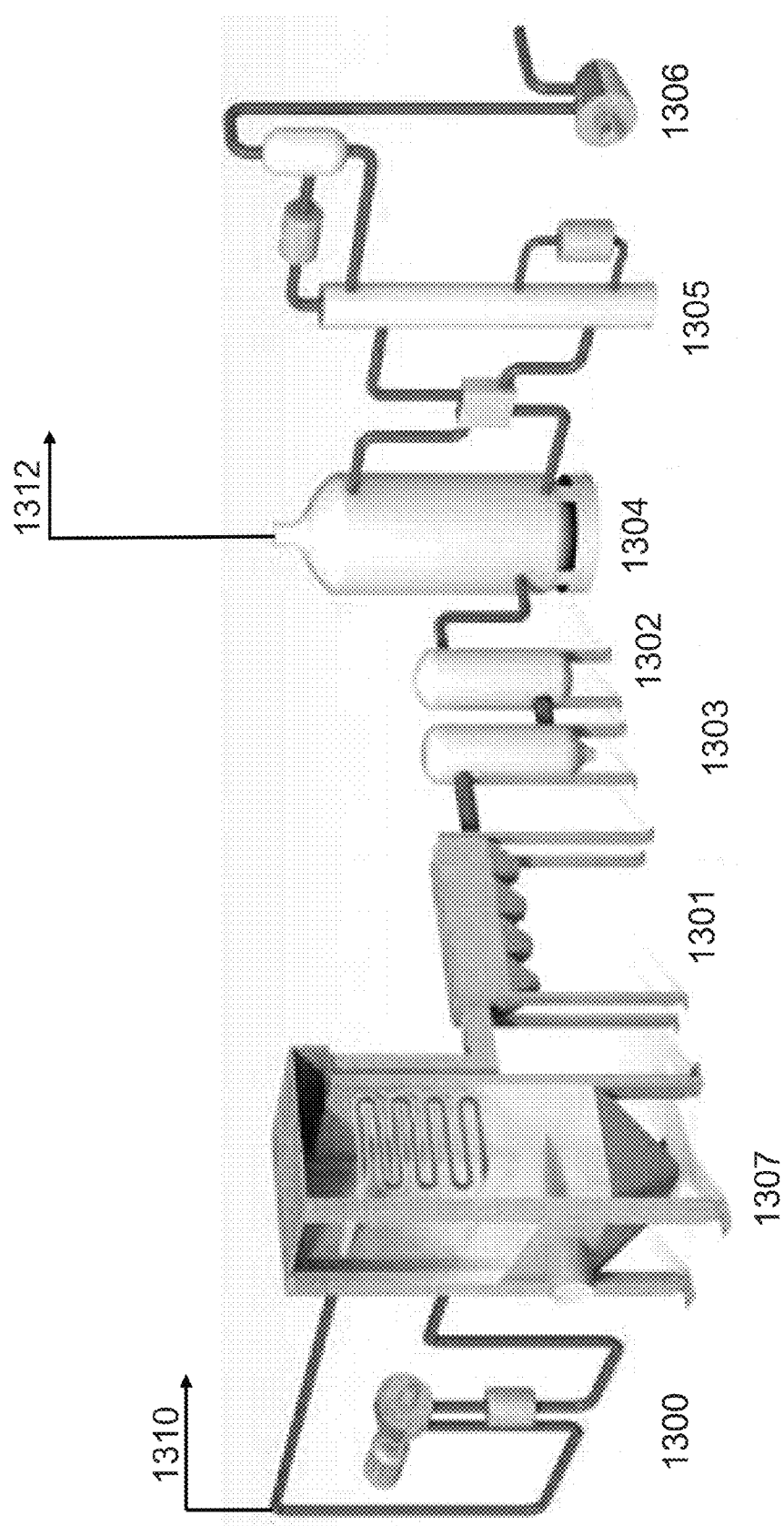
FIG. 3 is a schematic illustration of a prior art pre-treatment system for flue gases, and connected into this system of this invention.

It has been demonstrated that fossil fuel combustors, especially natural gas fired co-generation facilities (cogen), can be effectively, but minimally, pretreated to remove some of the $CO_2$ and any potentially blocking or poisonous impurities, with respect to the monolith array of the process of this invention. Subsequently, the pretreatment effluent can be diluted with ambient air, and used as a feed stock to the monolith arrays. Although certain gas-fired burners require only minimal pretreatment to remove problem impurities, in general the flue gas from a coal burning boiler requires extensive pretreatment to remove particulates and any compounds that may be poisonous to the sorbent or which tend to degrade the substrate. In one embodiment, the pretreated flue gas from the co-generation process is injected into the sorption system of this invention, along with additional ambient air. In this mixing process, the $CO_2$ concentration in the air is increased significantly (even with a minor proportion of the additional effluent gas), so that the adsorption step can be performed in a shorter period of time, comparable to that of a regeneration step. In a preferred embodiment, a parallel set of adsorber/regeneration modules operates in tandem with the existing facility. That is, one will be adsorbing $CO_2$ while the other is being regenerated, and vice versa. This mimics a continuous capture of $CO_2$. The process is represented by two stages, $CO_2$ adsorption and regeneration of, for example, turbine exhaust, as described in FIG. 1 of the accompanying drawings. In a preferred system, two pairs are operated together so that each tethered pair can act as counter-balances for each other, thereby saving capital costs for the elevators.

In Stage 1, atmospheric air is mixed with co-generated exhaust gas and the mixture is passed through the $CO_2$ adsorption module. This process uses a low-cost, high porosity ceramic substrate (monolith) such as those used in the automotive catalytic converters, e.g., cordierite, a silica product. $CO_2$ is captured on the solid sorbent which is bonded to and supported by the substrate. The sorbent does not vaporize or dissolve under the operating conditions during both sorption and stripping, or regeneration. Again, the basis for the effectiveness of this invention is the operation of both stripping and adsorption at relatively low temperatures.

As before, Stage 2 provides for the regeneration of the sorbent by stripping the adsorbed $CO_2$, using low temperature processing (steam) in a separate regeneration chamber, preferably located at an elevation different, preferably lower, than the adsorption housing position. This allows for a simple elevator system to move the monolith array adsorbent 3041 between the two levels. In developed regions, where land has value, the vertically off-set arrangement has reduced area. In less developed regions, such as the polar areas, a side-by-side arrangement may be preferred when situations, and sideways movements, e.g., along rails, may preferably be used in place of the elevator.

$CO_2$ and steam condensate are the only effluents from the Stage 2 regenerator. Generally, it has been shown that when operating at the temperatures set forth herein, the steam condensate liquid has substantially no sorbent material removed with it. The process adsorbs $CO_2$ from ambient air and can produce a relatively pure $CO_2$ product gas stream suitable for sequestration or, more significantly, for further industrial use. One example of such use is the generation of new fuel by using $CO_2$ as a feed material to a biological system. $CO_2$ capture efficiency has a measure of energy usage and the adsorber parameters are determined based upon concentration of $CO_2$ in the feed stream, and any naturally available air velocity provided to the adsorption system, i.e., prevailing winds. The efficiency is also further determined by the availability of saturated, relatively low temperature steam from a co-generation process, for the stripping of the $CO_2$ from the sorbent and regeneration of the sorbent. By providing a relatively pure $CO_2$ off gas, the cost of such $CO_2$ removal is minimized or can even be made profitable when the $CO_2$ is used, for example, to grow algae capable of providing new fuel, in oil fields for enhanced oil recovery, or other commercial or industrial applications now presented or which become available in the future. Growing algae for biofuels is expected to be a major profit center for using the carbon dioxide product of this process.

Tandem Operation:

As a further improvement to this process it has been found that capital and energy savings of a significant quantity can be achieved by integrating adjacent modules of the sorption/regeneration units in order to optimize the performance of each of the units.

It has been found that the operation and economics of the system can be optimized by quickly cooling the regenerated monolith to below the temperature at which it would be degraded in contact with ambient air. Although the specific temperature would depend upon the nature of the sorbent and monolith used, for a cordierite substrate and an amine sorbent, this temperature limit is below 70° C., in order to avoid excessive degradation of the monolith in the presence of ambient air. In addition, this should be accomplished as part of a regime to minimize to as great an extent as possible, the amount of externally provided heat needed to be added to the process while collecting high purity $CO_2$ removed from the sorbent.

In order to optimize the overall effectiveness of this system, and to obtain an efficiently operating system, the cooling of the monolith after regeneration must be accomplished very quickly, so that the steps of $CO_2$ capture by the sorbent on the monolith can be synchronized with the regeneration step. Most advantageously, the cool-down should preferably be achieved within no more than about 10 seconds in order to minimize the time when carbon dioxide is not being adsorbed by the monolith. Based upon the present invention, this effect is achievable in accordance with the use of the following process parameters:

It has been found that by combining the operation of a plurality of modules in tandem, a highly efficient system is provided when treating a uniform mixture of ambient air with flue-derived gaseous effluents added so as to increase the concentration of $CO_2$ in the feed gas several times above that found in ambient air. In addition, obtaining the desired purity of $CO_2$ from the stripping step requires that the regeneration box have the majority of the air exhausted before the $CO_2$ is stripped from the sorbent. The first array monolith 3041 has just been through a complete steam regeneration cycle and the carbon dioxide off gas pressure is at about 0.7 to 1 BAR. The second monolith array 3042, operating in tandem, has been lowered into the regeneration chamber after completing the $CO_2$ adsorption step and the air in the regeneration chamber 3042 is pumped down to between 0.2 and 0.1 BAR (which provides a steam saturation temperature of between 60° C. and 45° C., respectively). The air evacuation allows for improved purity of the stripped $CO_2$ withdrawn from the regeneration chamber after regeneration, and the cost to exhaust the air after the monolith array has entered the chamber and the chamber was sealed, is relatively a small amount of power (usually in the form of electricity).

The two tandem arrays are synchronized so that these conditions are met, at T=0. At that point, the outlets from the first regenerated array Box 3041 are switched to the input pipe of Box 3042 so that any steam trapped in Box 3041 and created by the evaporative cooling of the monolith array in Box 3051 is pumped into Box 3042, when line 3014 is opened, resulting from the large pressure differences (0.7-1 to 0.2-0.1 BAR), and the steam then condenses on the relatively cool monolith array 3042 in Box 3052, raising its temperature as is required for regeneration. In this manner, the heat removed from the first monolith array, when cooling, is transferred directly to the second monolith array to provide at least an initial heat to increase its temperature. The steam burst from Box 3051 into Box 3052 is occurring at a fast flow rate, and preferably at a flow rate of at least approximately 0.5 meter per second, in order to achieve the ten second target. The large pressure drop between the two regeneration chambers should make this feasible. When the process is completed, the system is at time cool ($T_{cool}$).

Box 3052 is preferably pumped down to 0.1 BarA, but Box 3051 is shut off from Box 3052 when Box 3052 reaches a pressure of 0.15 BarA. This will result in a desirable reduction of air in Box 3052 and, thus, a further improvement in the purity of the $CO_2$ ultimately to be removed. After the connection between Box 3051 and Box 3052 is closed, the steam for regeneration is allowed to enter Box 3052 and initially condenses on the monolith array 3042 which has been pre-warmed to a certain extent. The admission of the steam results in a pressure build-up to between about 0.7 and 1 BarA, as the $CO_2$ is removed from the sorbent on the monolith array and passed into Box 3052 and pushed out by the final steam. By allowing the pressure in Box 3052 to increase to 0.7 to 1 as a result of the $CO_2$ and steam collection, Box 3052 ends up as did Box 3051, at T=0, which includes the collection of $CO_2$ as it is removed from the sorbent on the monolith array. The time to reach this point is equal to $T_{cool}+T_{collect}$ (the time to collect the regenerated $CO_2$).

In the meantime, the cooled monolith array 3041 is exposed to air, and ambient temperature, as it is raised to the adsorption position. The time for monolith array 3041 to return to the adsorption position equals $T_{cool}$ (the time to cool monolith array 3041)+$T_{elevator}$ (the time to raise the monolith array to the adsorption position). Monolith array 3041 is exposed to a flow of air and, over a period of $T_{ad}$, until the adsorption reaches the desired extent, as a percent of saturation, or equilibrium. It is noted that, to operate this in the most efficient manner, adsorption does not continue to equilibrium, but, rather, is terminated by removal from the adsorption position at a lower level, generally in the range of 80% to 90% of the equilibrium amount, for the concentration of $CO_2$ in the feed gas.

To frame this result as a mathematical equation, it can be stated that $T_{cool}+T_{collect2}$ equals $T_{cool}+2T_{elevator}+T_{ad1}$. It is noted that $T_{collect}$ and $T_{ad}$ can be independently adjusted in order to reach this desired result. As it is generally desirable to maximize $T_{ad}$, generally $T_{cool}$ and $T_{collect}$ should be minimized to the extent feasible, and $T_{elevator}$ should be maintained at a low number.

When dealing with the mixed high $CO_2$ concentration gases, it would be desirable that the two tandem modules each have two modular arrays and the two front boxes of each of the tandem modules and the two back boxes of the two tandem modules would be linked so that the cycle of treating and removing $CO_2$ from air would be only ½ cycle out of phase with each other; where ambient air, without added $CO_2$ is being treated, a tandem design is unnecessary but $T_{ad}$ can be as high as ten times $T_{collect}$, so that if one were to phase ten units, where unit N would provide ½ the sensible heat for unit N+1, in principle, the heat from N10 could be re-looped back to N1 but the increase in efficiency may not be sufficient to justify the cost. This type of tandem system results in cutting water and heat usage almost in half, and the use of condensers or other cooling aids is omitted, along with the need for separate cooling water.

The monolith substrates provide a large heat sink. As a result of their large surface area, thin porous walls and, in many cases, good thermal conductivity, so as to provide fast cooling by the condensing steam as the steam passes through the porous monolith.

It has been found that by creating this system of process integration, sorbent lifetime can be increased, heat requirement and water usage can be reduced, while the purity of the $CO_2$ product can be increased. It has also been found that capital and energy savings are obtained by integrating neighboring modules. Moreover, it turns out to have a significant impact on the performance of the individual modules as well. The following three process objectives are, thus, cost effectively addressed:

Objective 1. To cool the current embodiment, i.e., cordierite, monolith to below 70° C. before exposing them to air, in order to prevent degradation. It must be noted that future sorbents may be more oxygen resistant so that the temperature need not be reduced quite as much; however, the lower the temperature of the monolith the faster the $CO_2$ adsorption.

Objective 2. To use as little heat as possible in the process; and

Objective 3. To collect a high purity $CO_2$.

Objective 1 has become increasingly important because of the need to cool down the monolith very quickly after stripping, as the monolith arrays, in general, have a large amount of sensible heat at that point in the process. The design target for cooling is 10 seconds, in order to minimize the time spent not adsorbing $CO_2$. The prior art believed that separate condensers were necessary to accomplish this result. However, many options of using condensers have been explored, but, as they all require very large surface areas and a great deal of cooling water, because of the large amount of heat and short time allowed for its removal, they have not been found to be practical. This is true regardless of the nature of the monolith substrate that is in use; although cordierite requires the greatest amount of heat removal, another type, for example, an alumina monolith, requires a smaller amount, by a substantial degree. However, even for those types, separate condensers were not found to be practical. Other adsorbent-supporting monoliths may require even less heat to be removed, but, in any event, the use of condensers has been shown to be inefficient under almost any feasible circumstances.

Objective 2 is also not met by the use of condensers because, transferring heat to cool water, where the water temperature needs to be maintained at a low temperature for effective heat transfer rate, renders it virtually impossible to economically recover the heat and, thus, cannot reduce the net energy requirements for the system.

Finally, Objective 3 requires that trapped air be removed from the regeneration Box 3052 before collecting $CO_2$. In addition, by designing the system for plug flow, so that the evolving $CO_2$ will push out the air before the systems switch to collecting the $CO_2$, the remaining air is first removed from the regeneration chamber. To achieve the target purity of at least 95%, a high degree of plug flow is desirable. Plug flow requires that there be no radial concentration differential of components with temperature and that there be no axial mixing in the direction of the flow of the gases. This can be achieved when treating ambient air in a single module, or when treating high $CO_2$ concentrated gas in a tandem module system. The following text only considers two neighboring tandem molecules to illustrate the process. The process steps are as follows:

Box 3051/Monolith array 3041: the monolith array is in the sealed regeneration Box 3051, and has just completed steam regeneration and $CO_2$ collection;—the steam off-pressure is about 0.7-1.0 BarA. This could include introducing some extra steam after breakthrough to push out any remaining $CO_2$ (see below).

Box 3052/Monolith array 3042 has just been lowered into the sealed regeneration Box 3052, after capturing $CO_2$. The Box 3052 is pumped down to 0.2 to 0.1, bar which provides a 60° C. and 45° C., respectively, steam saturation temperature at those pressures. This evacuation of the air will of course be a big help to purity of the $CO_2$ product, because the amount of air is only 20-10% of ambient air, and the cost to pump one box of air using electricity is less than 10% the cost to move air at 100 pascals pressure drop, and only 5% in the current embodiment.

Before this process we anticipated only pumping down to cool down after regeneration and would have had to do it twice if we also wanted to pump down for improved purity before regeneration. This integration of two neighboring modules accomplishes both tasks at the same time with a single evacuation. One can schedule two neighboring modules, which have independent cycles, so they both reach their above described condition at the same time. One can call this T=0.

Removal of the carbon dioxide and condensed steam from the carbon dioxide capture is carried out together with some of the steam and condensed steam into a separation chamber before Box 3051 output pipe 3021 is then switched closed and Box 3051 is opened to the steam distributor input pipe 3014 from Box 3052, upon completion of stripping and exhausting of $CO_2$ from the Monolith 3041. The remaining steam trapped in Box 3051 and created by evaporation (cooling) of monolith array 3041 is "pumped" into Box 3052 by the large initial differences in pressure (−0.7-1:0.2-0.1 BarA) and condenses on the cool monolith array in Box 3052, raising its temperature. So the heat removed from monolith array 3041 to cool it, is directly transferred to monolith array 3042, to heat it. The velocity of this initial steam burst from the water evaporating from the monolith array needs to be at least 10 times faster than the current 5 cm speed used for steam regeneration, or 0.5 msec, to meet the 10 second design target. Given the large difference in pressure when there is large mass flow and low pressure drop in the monolith array this should be easy to achieve. The two boxes would reach equilibrium at the saturated vapor temperature of steam at 0.2-0.1 BarA, which is 60-45 C.

To assure that the process is sufficiently fast, it is preferable to reduce the pressure in Box 3052 to 0.1 BarA, but the exit valve from Box 3052 is closed at 0.15 BarA. The temperature sought will depend on what maximum temperature is the limit to minimize degradation. The pump will have a check valve on it and will only be pumping after the initial pump down if there is a buildup of $CO_2$ in Box 3052 which is unlikely because at the low temperature the partial pressure of $CO_2$ is lower than 15% which is what 0.15 BarA would represent. So the sorbent will likely keep the partial pressure of $CO_2$ below 1 percent. One can adjust this by how much of the $CO_2$ we leave in Box 3051 before we open the valve 3014, which in turn can push out the remaining air further increasing the purity even before the regeneration process begins. The time for cooling plus switching and transit time of steam=$T_{cool}$: One then closes the connection 3014 between Boxes 3051 and 3052 and introduces the normal steam source, through line 3012, into Box 3052; the steam condenses on the pre-warmed monolith array 3042 and lets the pressure build up to 0.7-1 by the presence of $CO_2$ before beginning $CO_2$ collection and complete the steam regeneration process and collection of $CO_2$ at the slower rate to complete regeneration of Box 3052-ending up with Box 3052 where Box 3051 started. This takes time $T_{collect}$ so total elapsed time for Box 3052 is $T_{cool}+T_{collect}$.

Cooled Box 3051 is returned to ambient pressure, as the cooled monolith array 3041 is raised to the adsorption position. It takes a total time $T_{cool}+T_{elevator}$, and adsorbs for a period of time $T_{ad}$ and then is lowered for a total elapsed time of $T_{cool}+2\ T_{elevator}+T_{ad}$.

To get the two boxes in phase so they can swap their heat back and forth one needs $$T_{cool}1+T_{collect}=T_{cool}1+2T_{elevator}+T_{ad}$$

Since $T_{collect}$ and $T_{ad}$ are independently adjustable this condition can be easily met. To maximize $T_{ad}$ one wants to minimize $T_{cool}$ and $T_{collect}$ and have a low $T_{elevator}$. For the case of the carburetor and tandem design, two neighboring modules would each have two module arrays and one would link the two front boxes from each and the two back boxes so that there is no loss in duty cycle—they would be one half cycle out of phase with each other.

In the case of air only, a non-tandem design is useful; where the $T_{ad}$ might be 10 times $T_{collect}$ one could in principle phase 10 units where unit n would provide ½ the sensible heat for unit n+1. One could in principle also reloop the heat from N10 back to N1 but that would only buy you an extra 5% in heat efficiency, with great additional cost and complexity.

The advantages of this process in water and heat usage are clear, a factor of close to a reduction by a factor of two for both inputs. There is no extra capital cost for a large condenser and no need for any cooling water. The substrates are a great heat sink because of their large surface area and thin walls, and alumina has a good thermal conductivity and thus offers extremely fast "cooling" of the condensing steam possible.

To demonstrate these advantages, the following calculations illustrates the basic performance of this system in being able to remove the heat from the regenerated monolith array at a sufficient rate to meet the 10 second design target utilizing the aforedescribed system. Although the use of monoliths as heat sinks had previously been recognized, using them in this manner, and in the context of this process of $CO_2$ capture from air, has not been known or suggested.

BASIC PERFORMANCE

To operate in the current system, it is necessary to evaporate 22 Kg of water/steam from a hot monolith array of 640 individual monoliths to cool the array, such as monolith array 3042, to 55° C. from 110° C. and to condense the evaporated steam, within ten seconds, onto the cool, e.g., monolith array 3041, to prewarm that array. The latent heat of steam in this temperature range is $2.3 \times 10^6$ joules so one needs to remove HR=$50.6 \times 10^6$ joules in T=ten seconds.

The surface area in a single monolith is quite large. There is 6.4 m² in each 6 in×6 in×6 in monolith (Nc=230 cell/in², SA=surface area/monolith=4 s Nc L FA) where s is opening=1.3 mm, $36.8 \times 10^4$ cells/m², L=0.15). For a standard unit array of 640 monoliths, e.g., the units 3041 or 3042, the total surface area is TSA=4,216 m2.

Thus the thermal flux needed is TFN=HR/TSA=$12 \times 10^3$ joules/m2 in ten seconds, which is quite low; even if any non-condensable gases remain, the steam will condense quickly enough to cool the unit. The only issue is whether heat can be removed fast enough. It is noted that the condensed water, which tends to limit heat transfer in most condensing systems, is unlikely to be a significant problem in the heat transfer in this case. The 22 kg of water occupies $22 \times 10^{-3}$ m³, which if divided by the TSA of 4,216 m² yields a water depth of only 0.005 mm, even without considering that some of the water will be in the pores of the walls. Furthermore at these low temperatures and pressures the sorbent on the monolith itself will remove and immobilize the $CO_2$, limiting any buildup of concentration of $CO_2$ in the gas phase.

The thermal conductivity k of alumina is 18 watts/m/° K, but because it is porous assume k=10 watts/m° K. Now the TF, thermal flux/m² in ten seconds in the monolith walls=kT ($\Delta$Temp/w), where w is ½ the wall thickness of the monolith channels. Taking a conservative value for w of 0.2 mm, and for $\Delta$Temp of only 10° K, TF=$5 \times 10^6$ joules/m2, which is much greater than TFN. The potential performance exceeds the requirements by a sufficient amount that it raises the possibility of doing the $CO_2$ collection at a very fast rate. This could enable a very short cycle time, which could have other benefits. Most notably enabling one to use a short monolith array to capture $CO_2$ at very high concentrations in the gas mixing case. Alternatively, one could also consider smaller sized module array units for the minor quantities of flue gases, since their productivity would be so high.

In the basic embodiment, for treating the monolith array in unit 3051 to cool it down after regeneration and at the same time transfer the heat to the neighboring monolith array in unit 3052, loaded with $CO_2$, it might have been assumed that the temperature of the loaded monolith array was the same as the input feed ambient air flue gas mixture which had an 8-fold enhancement in $CO_2$ concentration. It should be noted in some situations it might be desirable to arrange for the monolith array in unit 3052 to heat up due to $CO_2$ adsorption thus storing the heat of reaction. For example by reducing condensed water available for cooling during adsorption; this could raise the overall thermal efficiency of the process even more—

In the base case, one-half the sensible heat could be saved—In the present case, it would be the sum of ½ the heat of reaction+½ the sensible heat.

One can think of this as increasing the gas mixing heat efficiency by adjusting its operating Temperature: the optimum will depend upon the temperature dependence of the oxidative degradation of the monolith. Generally, the heat of reaction of the sorbent, and the ratio of sensible heat to heat of reaction per tonne of $CO_2$ (e.g., loading and material and density of monolith walls) will be taken into account.

Once the concentration non-condensable gases are reduced to a level needed to achieve the rate of condensation required, the next challenge is to remove the heat fast enough. As pointed out by Martin and others—this is both a mass problem (how much coolant-specific heat) and a thermal conductivity problem (how fast can the heat be removed from the condensing surface).

In the embodiment of FIG. 8 (taken from the incorporated prior application Ser. No. 13/098,370, where only one of the pairs of carbon dioxide removal structures is shown but a connection to the second regeneration chamber 2006A is added) the carbon dioxide removal structures are moved between the $CO_2$ capturing zone 2003 and the sealable $CO_2$ stripping/regeneration chamber 2006. When a substrate is moved to the $CO_2$ stripping chamber 2006, i.e., the lower position as shown in FIG. 8, the substrate is at substantially ambient temperature due to the cooling effect of the condensed steam in the substrate when moved out of the carbon dioxide capture chamber, the heat of reaction of the sorption activity having been removed by the evaporative effect of the water combined with the convective effect of the blown mass of air from which the $CO_2$ was removed, which is far greater than the amount of $CO_2$.

Any trapped air in the substrate 2002 and chamber 2006 can be pumped out, e.g., by an air evacuation pump 2023, or even by an exhaust fan, to form a partial vacuum in the chamber 2006. Next, process heat, e.g., in the form of saturated steam from the Steam co-generator 2019, is directed at and through the $CO_2$-laden substrate 2002 in the carbon dioxide capture chamber 2006.

Carbon dioxide is removed from the sorbent (stripped off) by the flow of relatively hot steam; the incoming steam is at a temperature of not greater than 130° C., and preferably not greater than 120° C., and most preferably not greater than 110° C. Under most circumstances a steam temperature of 100° C. is sufficient. The vapor, comprising primarily carbon dioxide and some steam, flows out of the carbon dioxide capture chamber 2006, through exhaust conduit 2008 into a separator 3009, where liquid water is separated as shown and at least some of the steam present is condensed. The liquid condensed water is separated from the gaseous stripped $CO_2$. Some of the steam that is condensed in the sorbent structure itself during the stripping process either will be collected in a drain at the bottom of the regeneration chamber (e.g., by tipping the structure slightly off level and pass into container 20) or will be evaporated upon being exposed to the low pressure in the pumped out second regeneration chamber 2006A of the pair, after the majority of the $CO_2$ had been removed to chamber 3009. The condensed water left in the porous substrate structure will be evaporated when the mixed ambient air is passed through the carbon dioxide removal structure during the adsorption step.

The stripped $CO_2$ from the regenerated sorbent is in turn pumped into a storage reservoir 2012, where it is maintained at slightly elevated pressure for immediate use, e.g., to provide $CO_2$-rich atmosphere to enhance algae growth, or the carbon dioxide gas can be compressed to higher pressures, by means of compressor 2014, for long term storage or to be pipelined to a distant final use, e.g., sequestration or treating of oil wells or natural gas wells to improve production. During any compression phase, the $CO_2$ is further purified by the condensation of any remaining water vapor, which water condensate is in turn separated from $CO_2$, by known means.

The idea works for both the tandem which is the preferred embodiment, but can also be adapted for the non-tandem case as well. Box/Monolith 1 has completed steam regeneration, and the steam shut-off. Box 3052 has just been lowered after adsorbing $CO_2$, and pumping out of the air from Box 3052 is beginning, to reduce the pressure in Box 3052 to 0.2 to 0.1 BarA. The Box 3051 output pipes are switched to the steam distributor input pipes of Box 3052; the steam from the evaporating condensed water in Box 3051 condenses on the relatively cool monolith in Box 3052, raising its temperature. The velocity of this initial steam burst from the water evaporating from the monolith needs to be at least 10 times faster than the current speed, or 0.5 msec; this will help spread out the heating but still will have a sharper front than the air case by 5, so no steam will come out the back end. The two boxes will reach an equilibrium at a temperature less than $(T_{regen}-T_{air})/2$ because some of the heat will be taken away by the evaporating $CO_2$. The 3051 connection is then closed and steam is introduced into Box 3052 from the steam source to complete the heating to $T_{regen}$ and collection of $CO_2$ at a slower rate to complete regeneration of Box 3052. Box 3051 containing the cooled monolith array 3041 is then exposed to the ambient air and is raised to the adsorption position.

One process negative is that for a brief time both Box 3051 and Box 3052 are not absorbing $CO_2$ from air. In the case of air capture where the boxes 3051 and 3052 are side by side; the cycles for the two boxes can be phased so both do not have a reduction in duty cycle. Also in another embodiment in the tandem application, if the monoliths were arranged back to back, than one box would be steam stripping in the direction opposite from the capture direction.

The following invention is claimed:

1. A method of removing and capturing concentrated carbon dioxide from carbon dioxide laden air, the method comprising
   admixing a first flow of carbon dioxide-laden ambient air with not more than 50% by volume of an effluent gas, where the effluent gas is derived from a flue gas from the combustion of hydrocarbons, and directing the first flow of admixed ambient air to a first carbon dioxide removal structure; the carbon dioxide removal structure comprising a sorbent supported upon a porous substrate and capable of exothermically and releasably binding carbon dioxide to remove a predetermined portion of the carbon dioxide from the first admixed ambient air mixture;
   passing the first carbon dioxide removal structure into a first sealed carbon dioxide capture chamber, exhausting air from the first sealed capture chamber to reduce the air pressure therein, and passing steam, at a temperature of not greater than 120° C. into and through the first carbon dioxide removal structure to strip carbon dioxide from the sorbent and regenerate the sorbent, and removing the stripped carbon dioxide from the first sealed capture chamber, so as to capture concentrated carbon dioxide;
   admixing a second flow of carbon dioxide-laden ambient air with not more than 50% by volume of an effluent gas, where the effluent gas is derived from a flue gas from the combustion of hydrocarbons, and directing the flow of admixed ambient air to a second carbon dioxide removal structure; the second carbon dioxide removal structure comprising a sorbent supported upon a porous substrate and capable of releasably binding carbon dioxide to remove a predetermined portion of the carbon dioxide from the second admixed ambient air mixture;
   passing the second carbon dioxide removal structure into a second sealed carbon dioxide capture chamber, exhausting air from the second sealed capture chamber to reduce the air pressure therein, and passing steam, at a temperature of not greater than 120° C. into and through the second carbon dioxide removal structure to strip carbon dioxide from the sorbent and regenerate the sorbent, while the steam condenses, and removing the stripped carbon dioxide from the second sealed capture chamber, so as to capture concentrated carbon dioxide;

the first and second carbon dioxide removal structures being operated in tandem, such that when the first carbon dioxide removal structure has completed a regeneration cycle, and the second carbon dioxide removal structure is prepared to carry out its regeneration, the remaining steam in the first carbon dioxide capture chamber is flashed into the reduced pressure second carbon dioxide capture chamber in order to cool the first carbon dioxide removal structure and prewarm the second carbon dioxide removal structure prior to regeneration with saturated steam; and the first carbon dioxide removal structure is removed from the first capture chamber and moved into a flow of admixed ambient air;

passing saturated steam into the second carbon dioxide capture chamber to regenerate the second carbon dioxide removal structure and removal of the carbon dioxide and condensed steam from the second carbon dioxide removal structure; and repeating the tandem operation so that the first carbon dioxide removal structure is returned to the first carbon dioxide capture chamber after adsorbing carbon dioxide from the flow of admixed air and the pressure in the first carbon dioxide capture chamber is reduced, and opened to the higher pressure in the second carbon dioxide capture chamber.

2. The method of claim 1, wherein the carbon dioxide and condensed steam removed from each of the capture structures is passed to a separation vessel to remove condensed steam as liquid and to pass the concentrated carbon dioxide for further processing.

3. The method of claim 2, wherein the carbon dioxide is further processed by being compressed sufficiently to remove remaining water vapor to obtain highly concentrated CO2 of at least 95% purity.

4. The method of claim 1, wherein the pressure in each of the carbon dioxide capture chambers is reduced to not greater than 0.2 BarA.

5. The method of claim 1, wherein the pressure in each of the carbon dioxide capture chambers is reduced to not greater than 0.15 BarA.

6. The method of claim 1, wherein the admixed ambient air contains a concentration of $CO_2$ at least two orders of magnitude greater than the concentration of $CO_2$ in ambient air.

7. The method of claim 1, wherein the carbon dioxide removal structure comprises an array of porous substrate monoliths formed of a material selected from the group consisting of silica, alumina, and alumina coated silica, and wherein the substrate is supporting an amine sorbent.

8. The method of claim 7, wherein the sorbent is a primary amine.

9. The method of claim 1, wherein the steam is saturated steam.

10. The method of claim 9, wherein the saturated steam is process heat steam.

11. The method of claim 5, wherein the pressure in each of the carbon dioxide capture chambers is reduced to 0.1 BarA.

12. The method of claim 1, wherein condensed steam remains in the pores of the substrate when the regenerated carbon dioxide removal structure is removed from the capture chamber and moved back into a flow of admixed ambient air, so as to serve to moderate the temperature of the sorbent and substrate when adsorbing $CO_2$ from the admixed air.

13. The method of claim 12, wherein the ambient air is admixed with less than 50% by volume of the effluent gas.

* * * * *